May 28, 1935. S. W. SPARKS 2,002,966
METHOD OF AND APPARATUS FOR EXTRUDING TUBES AND OTHER ELONGATED SHAPES
Filed Nov. 12, 1932 28 Sheets-Sheet 1
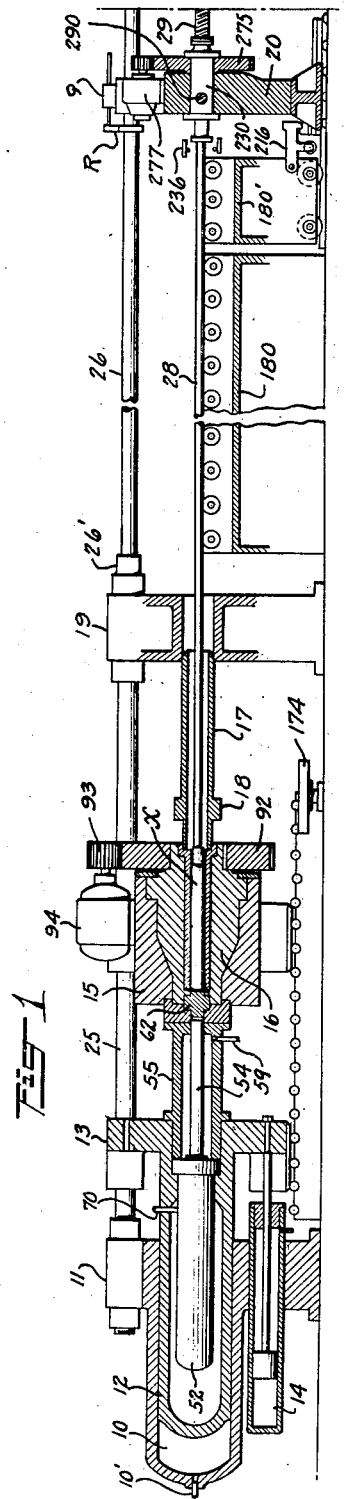
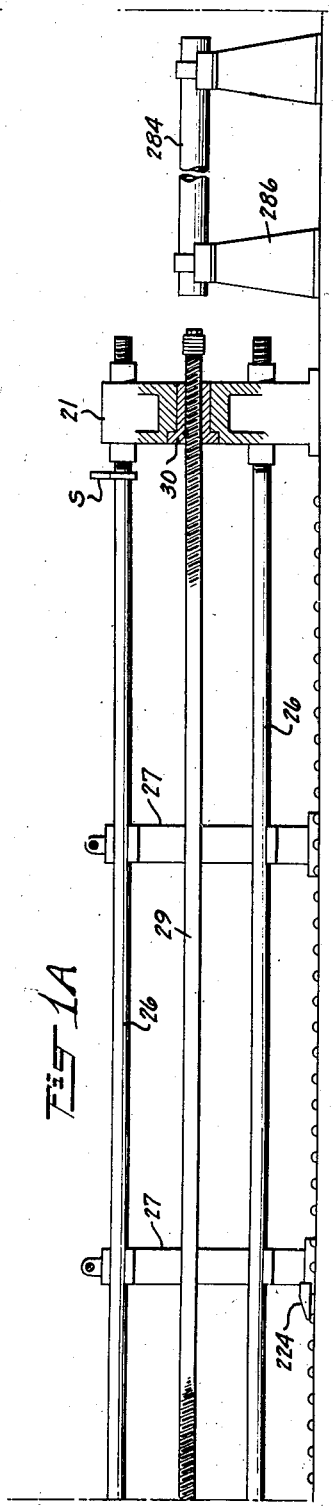
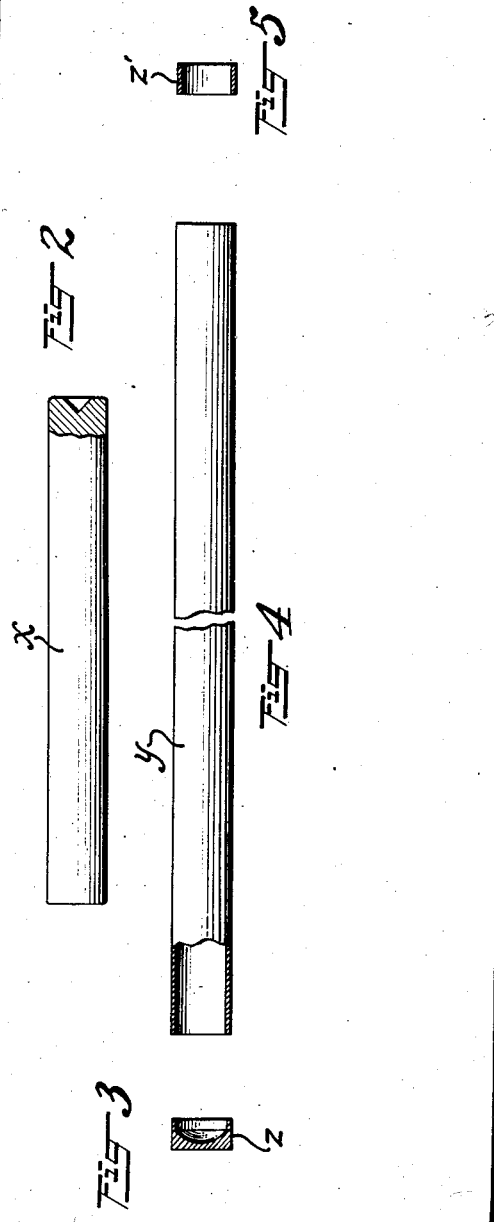
INVENTOR:
STANLEY W. SPARKS,
BY
His ATTORNEY.

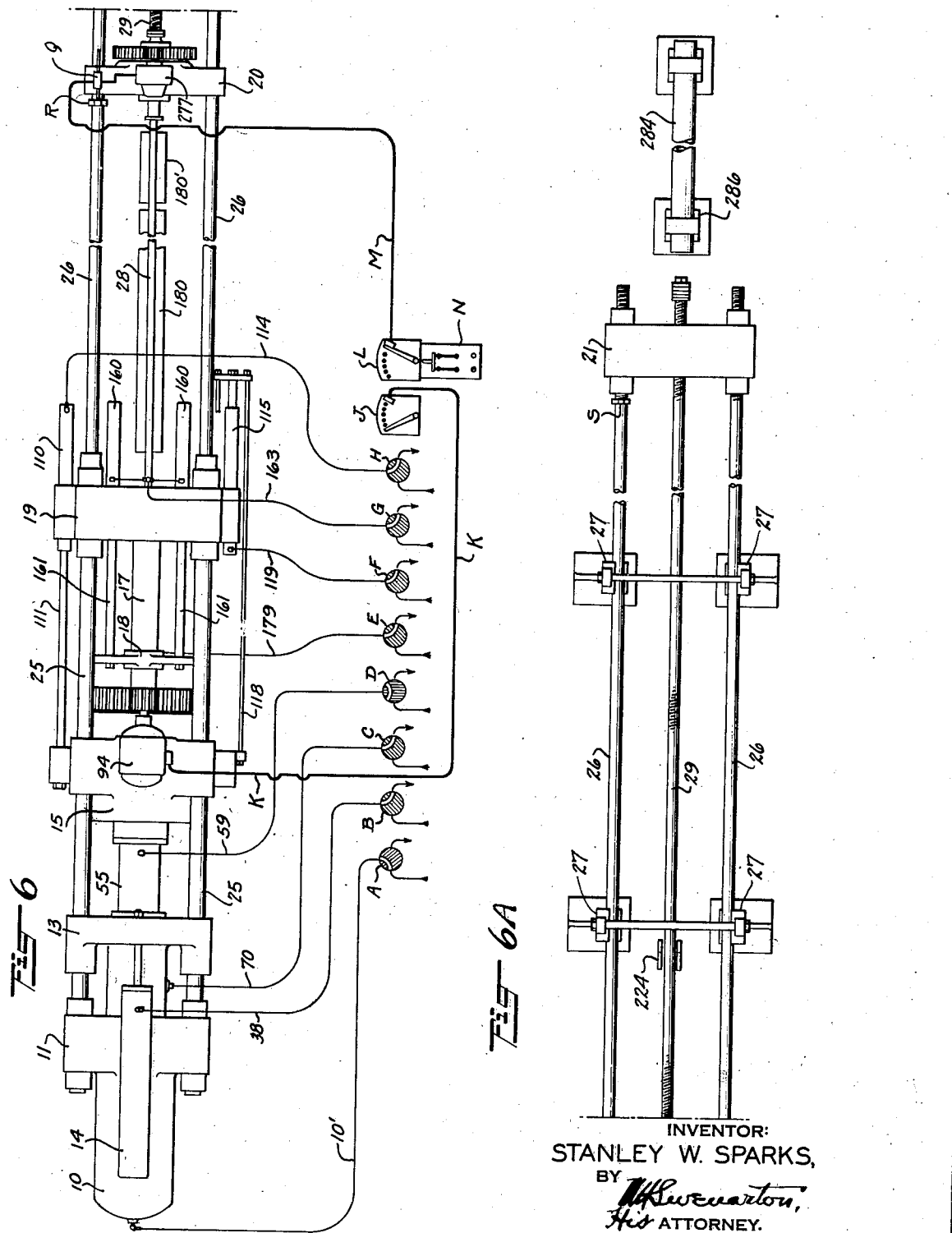

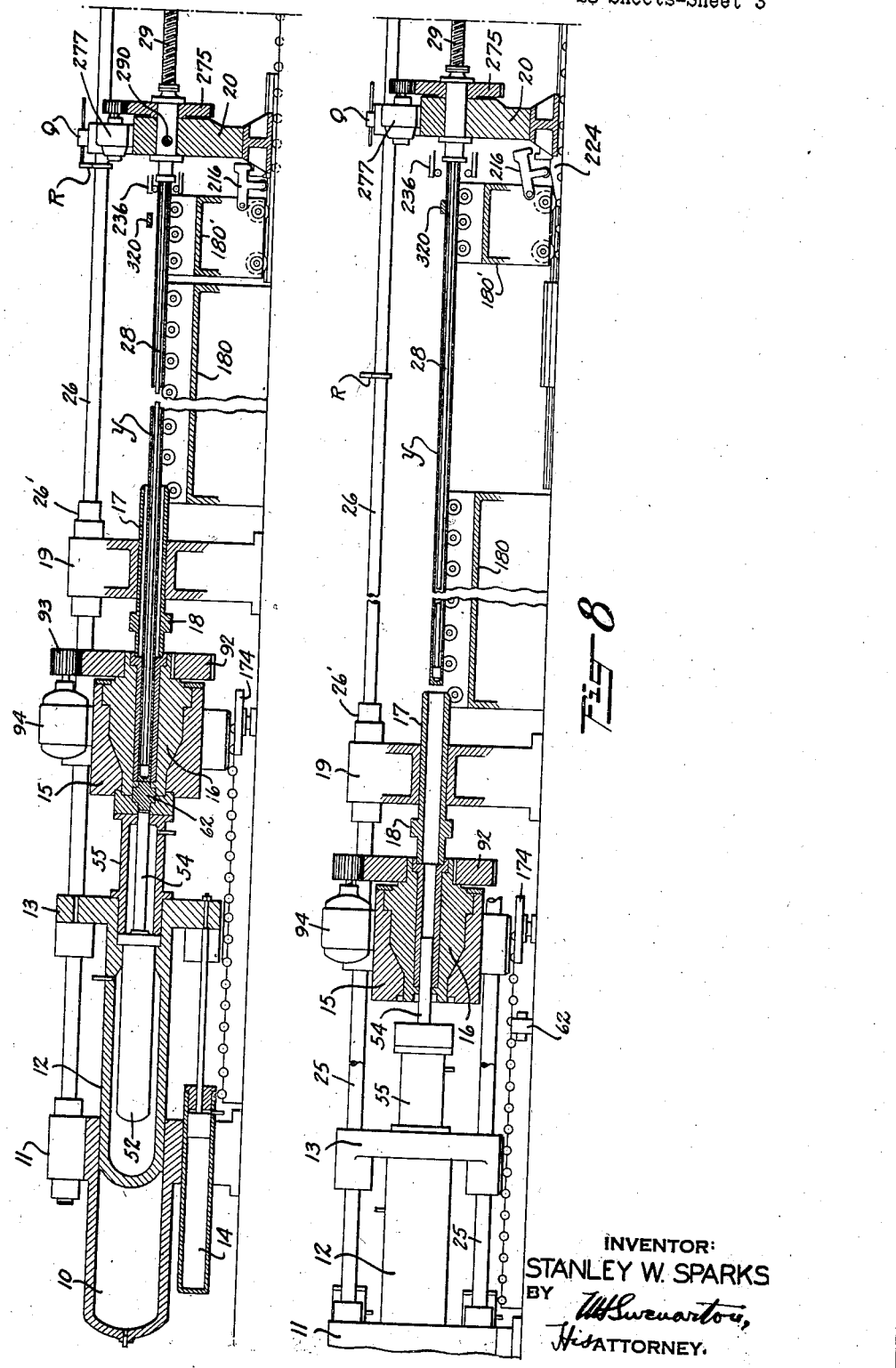

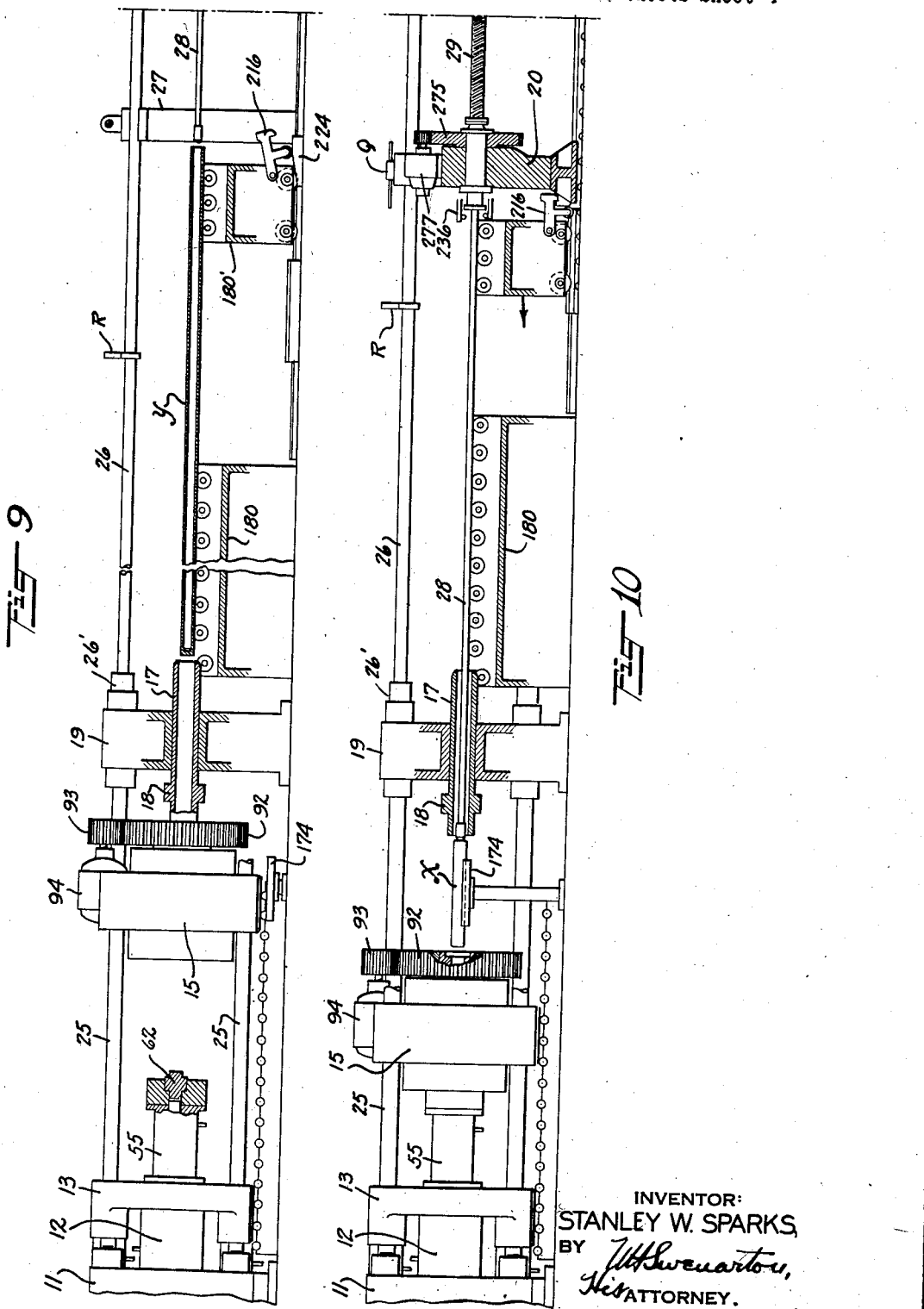

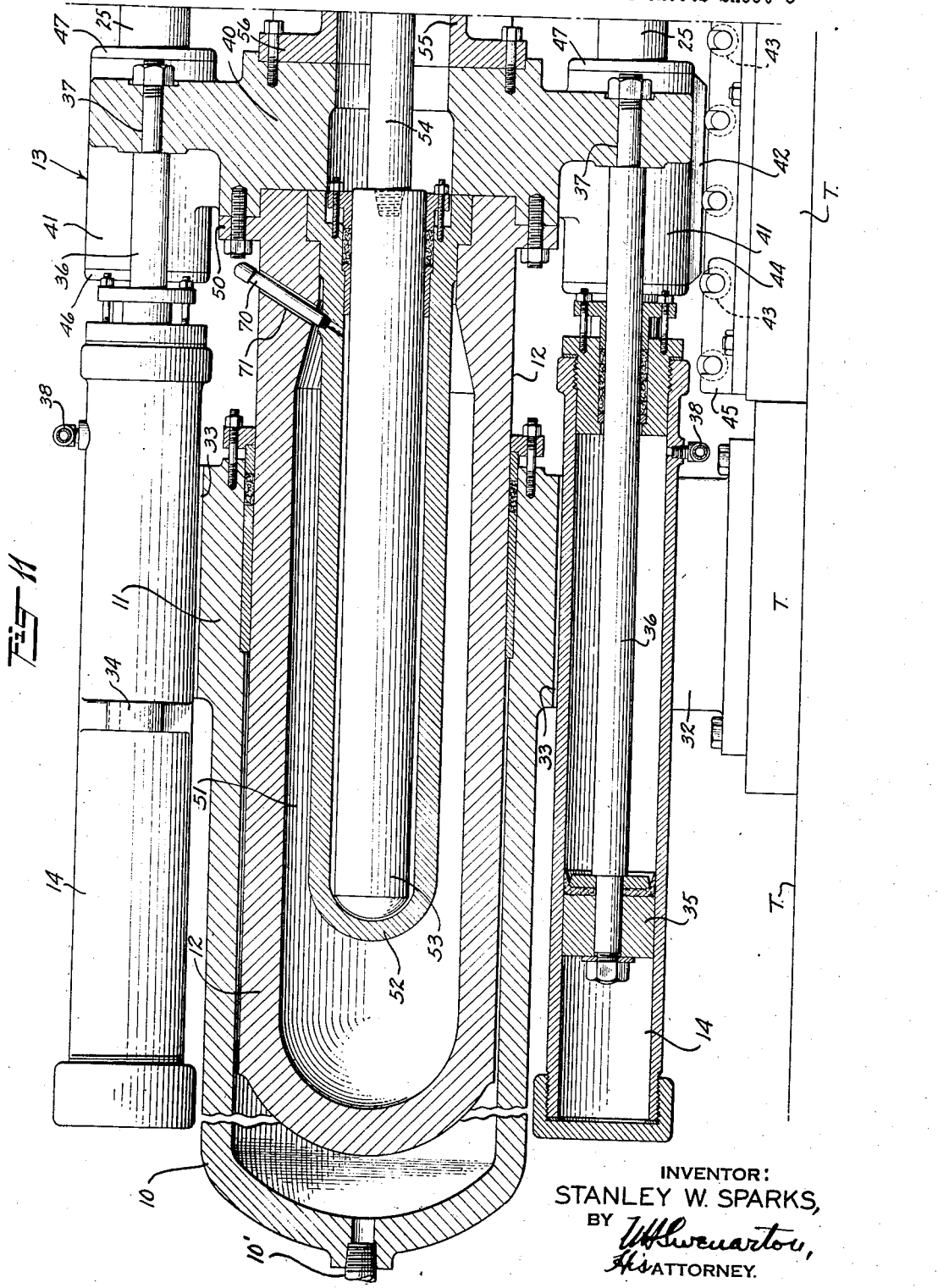

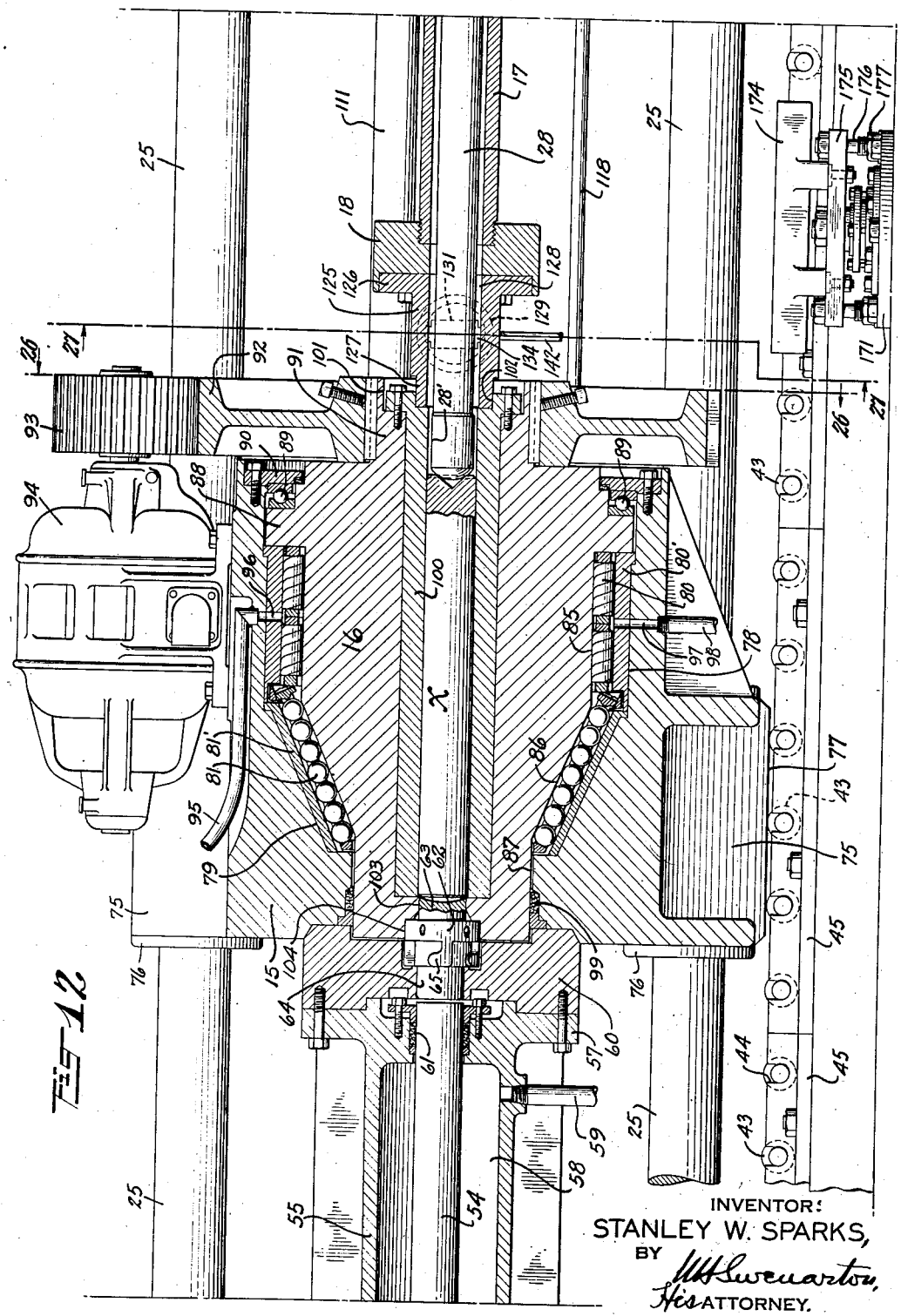

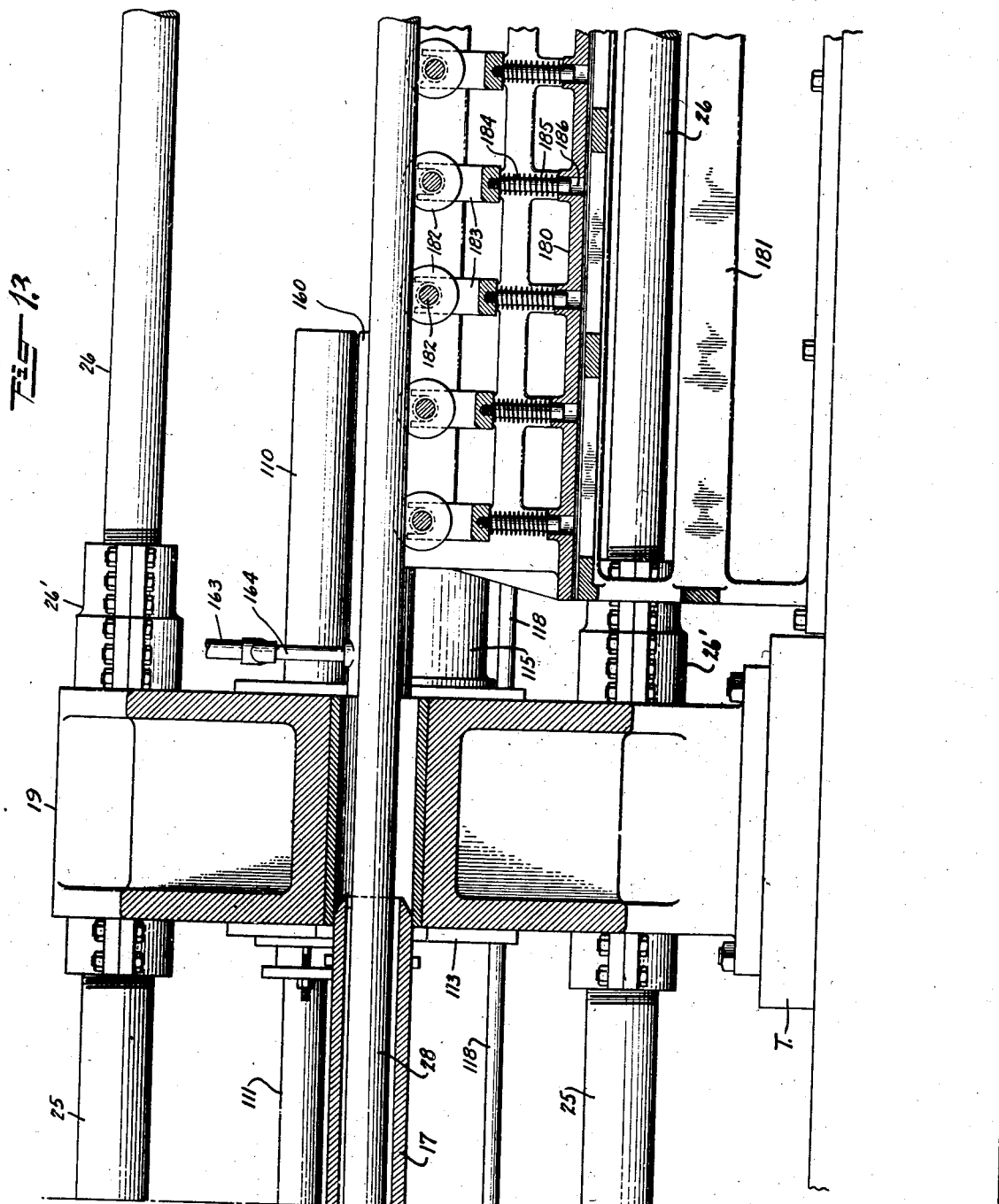

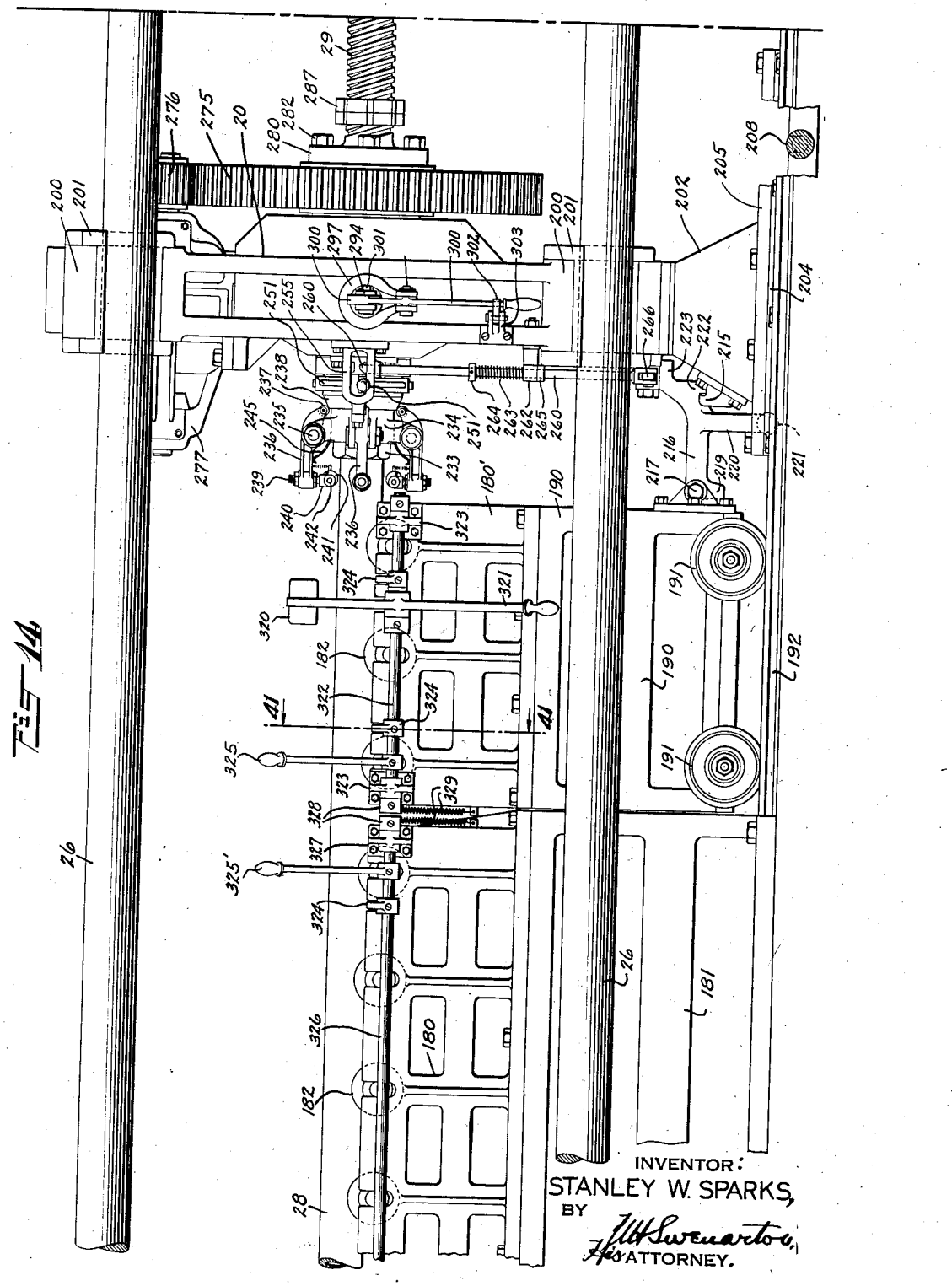

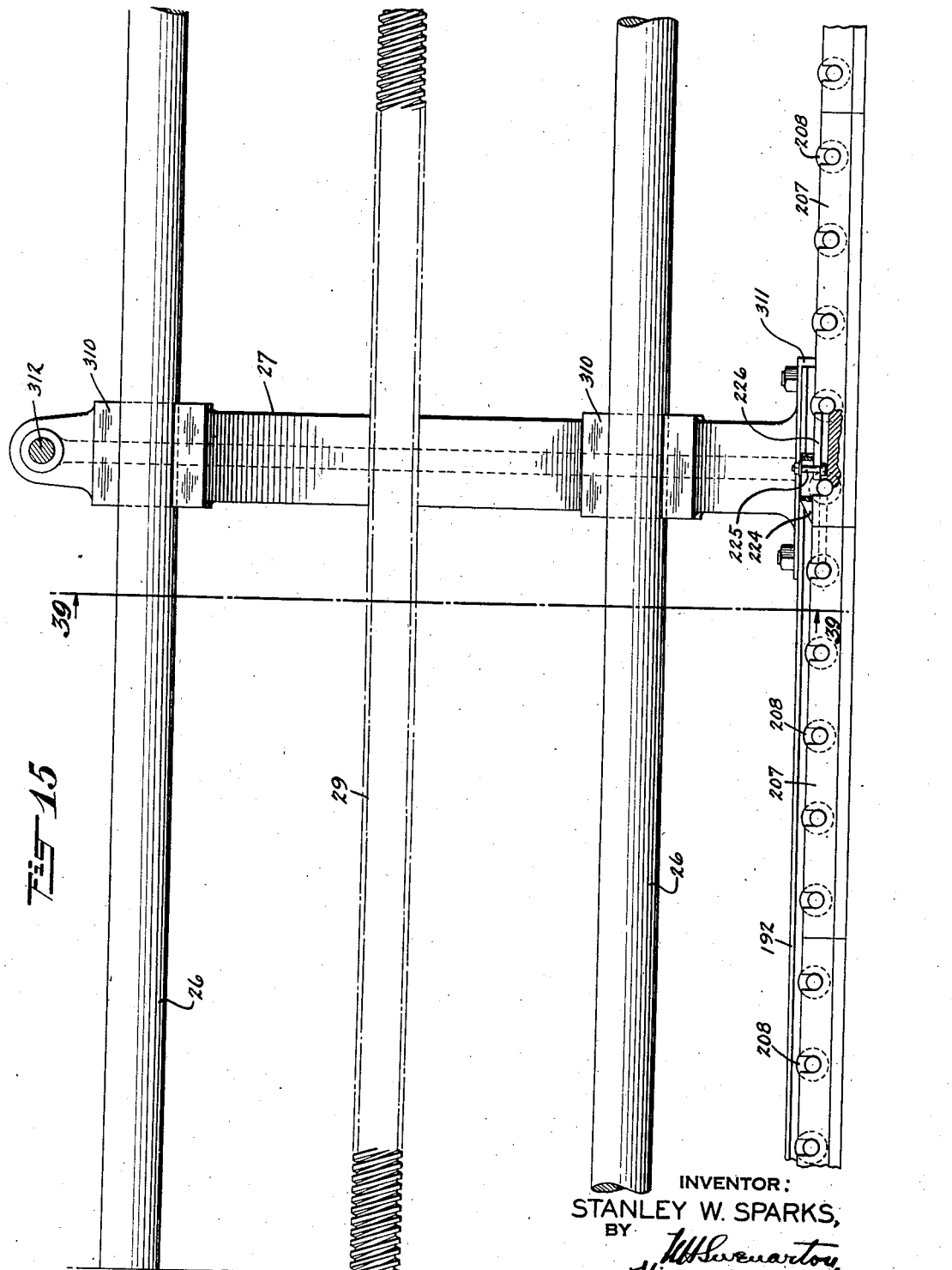

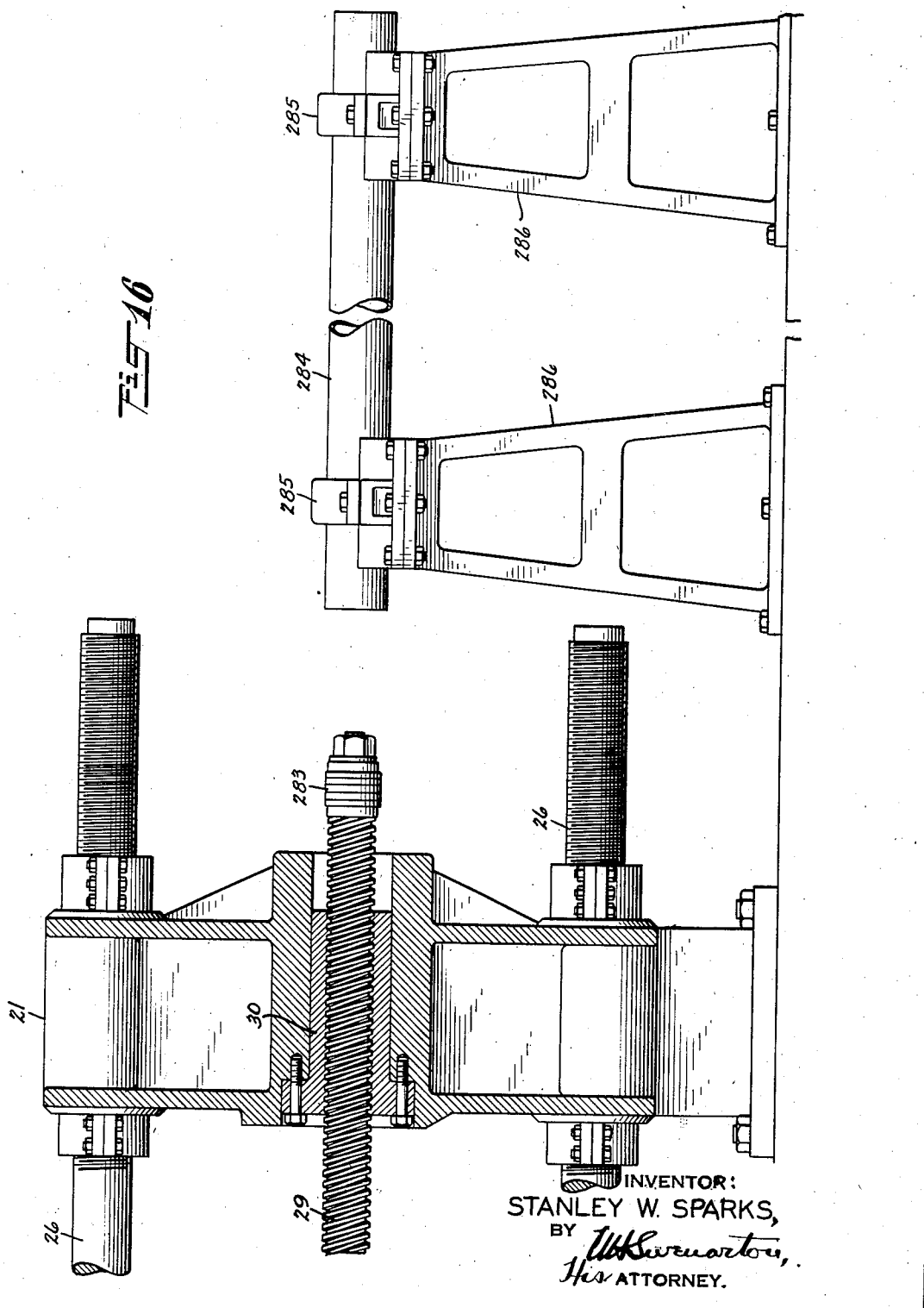

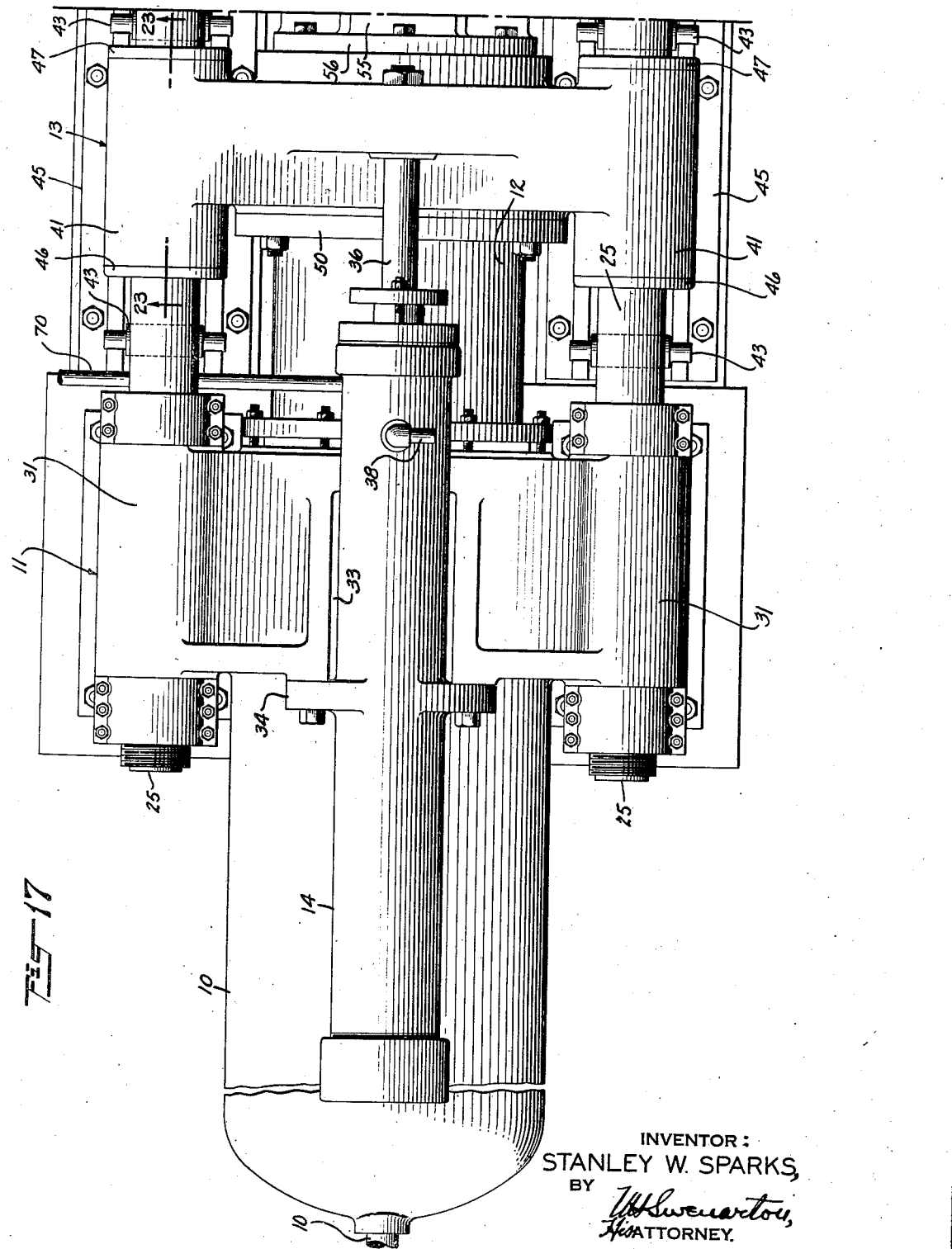

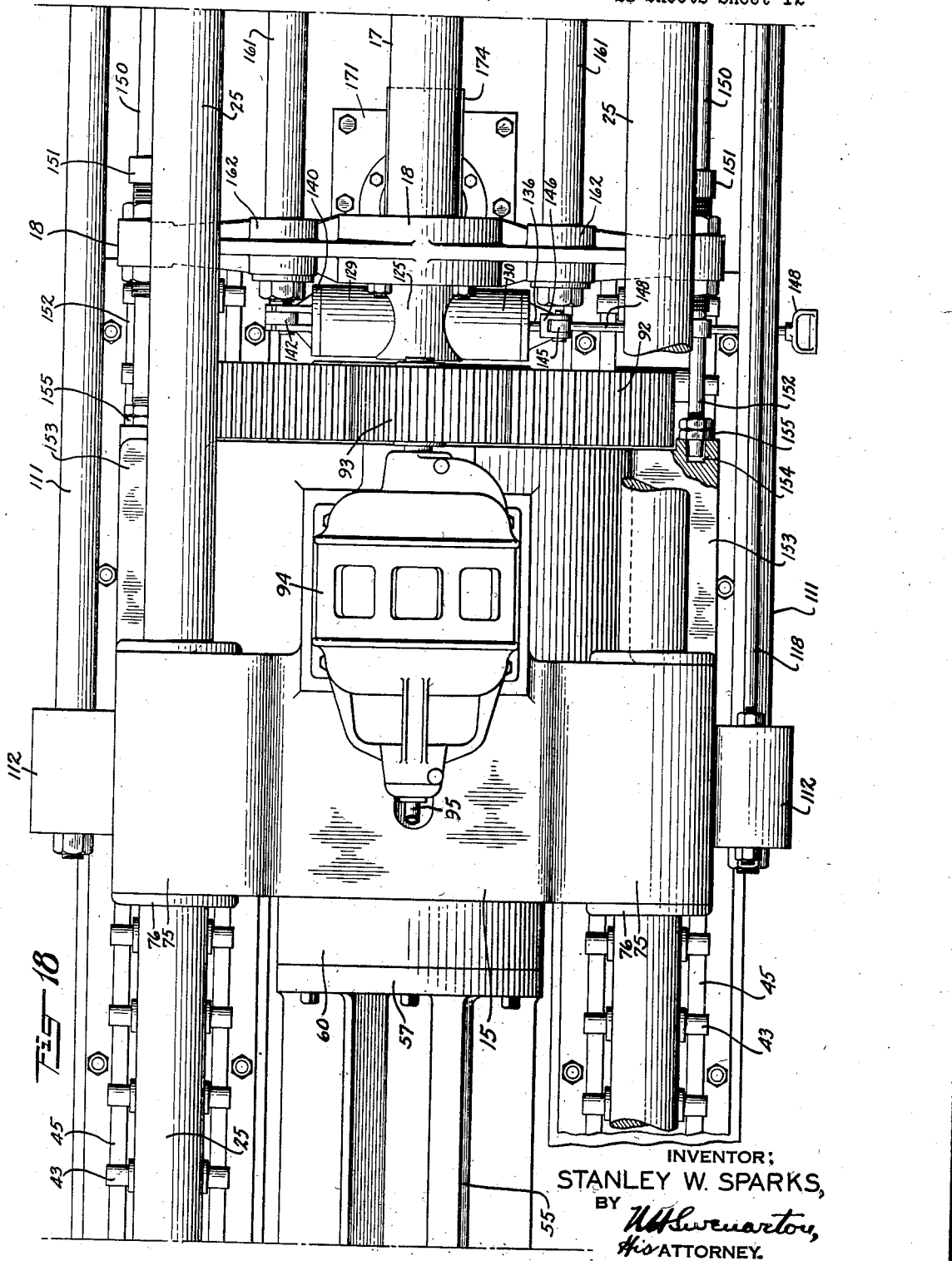

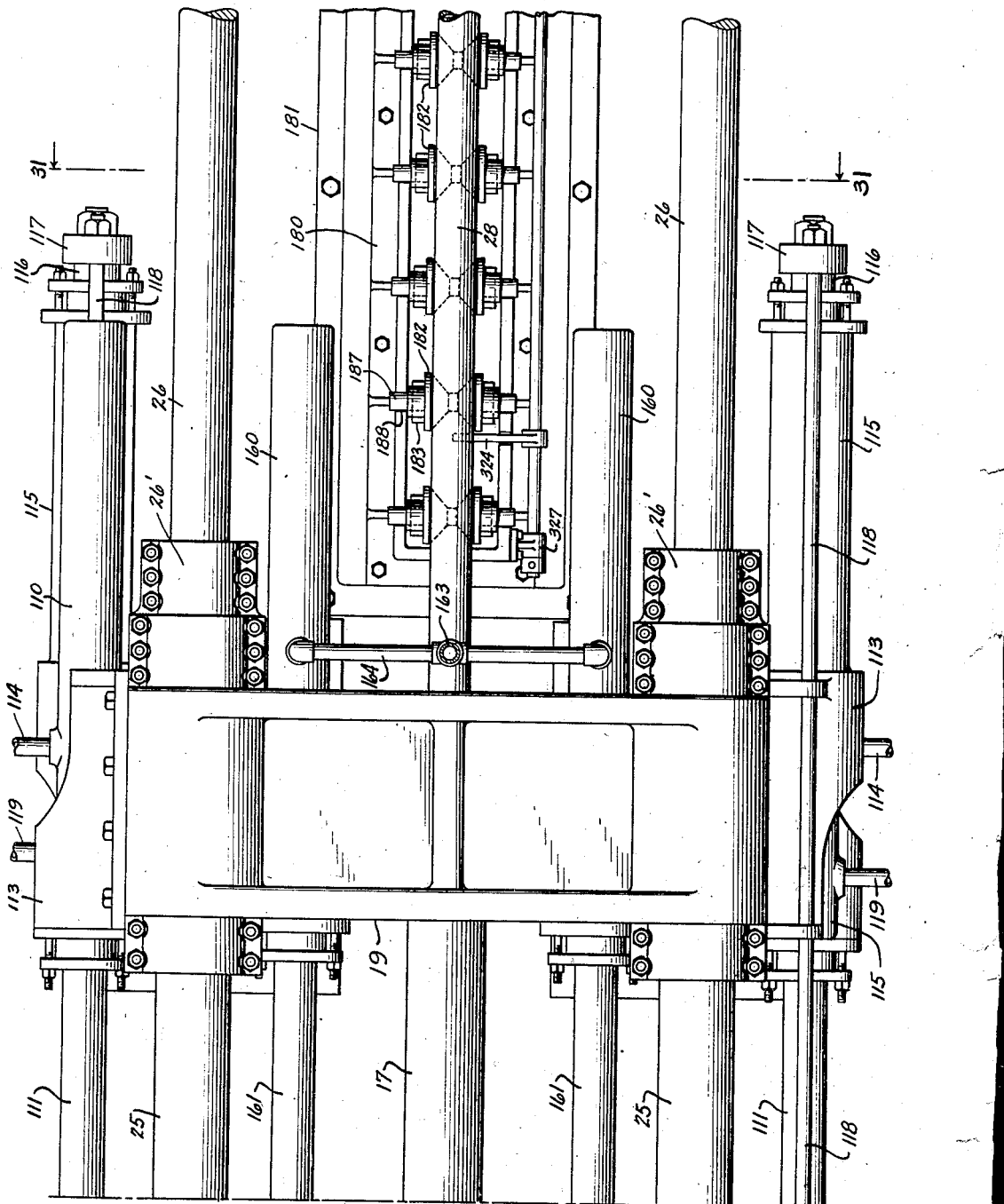

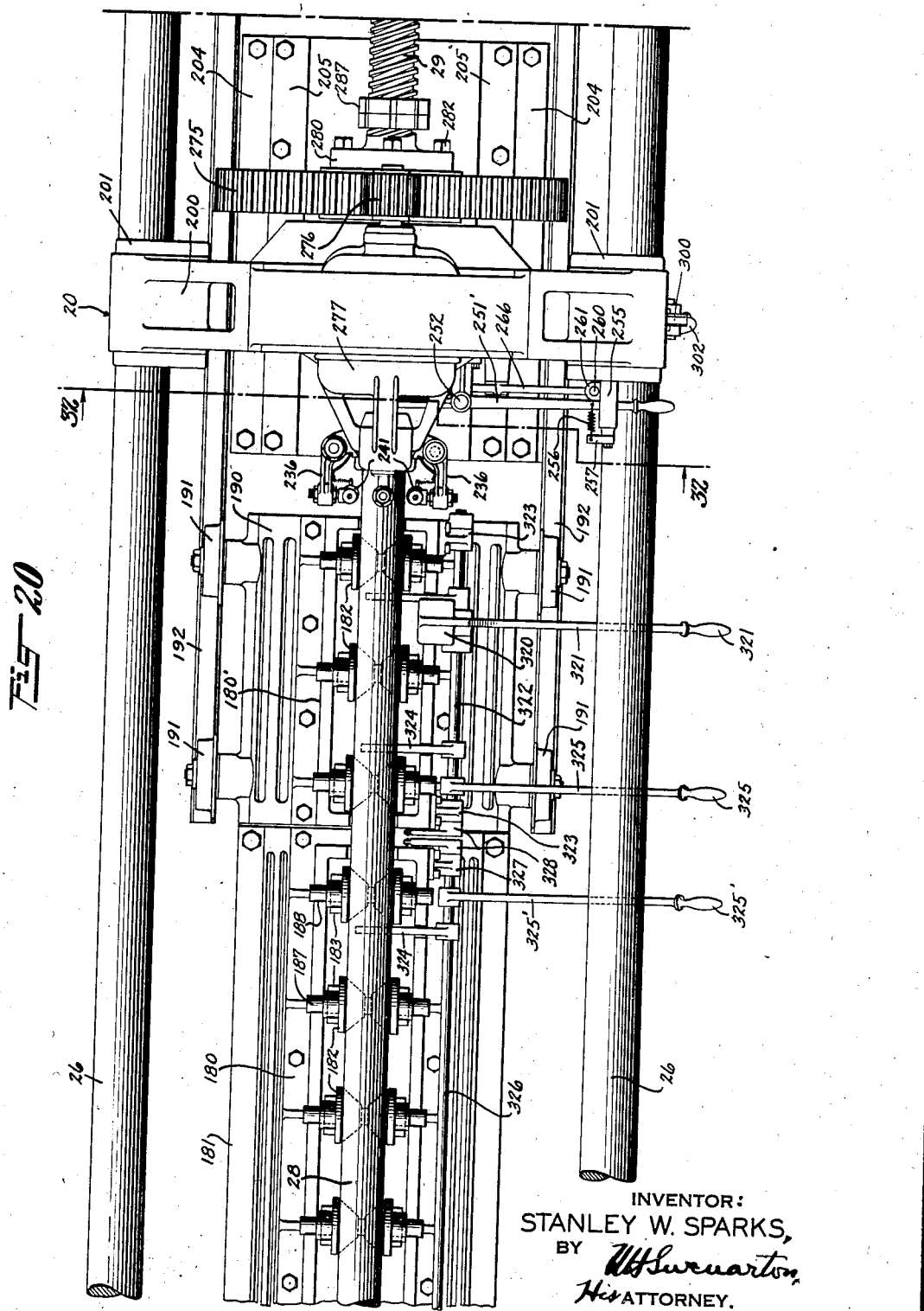

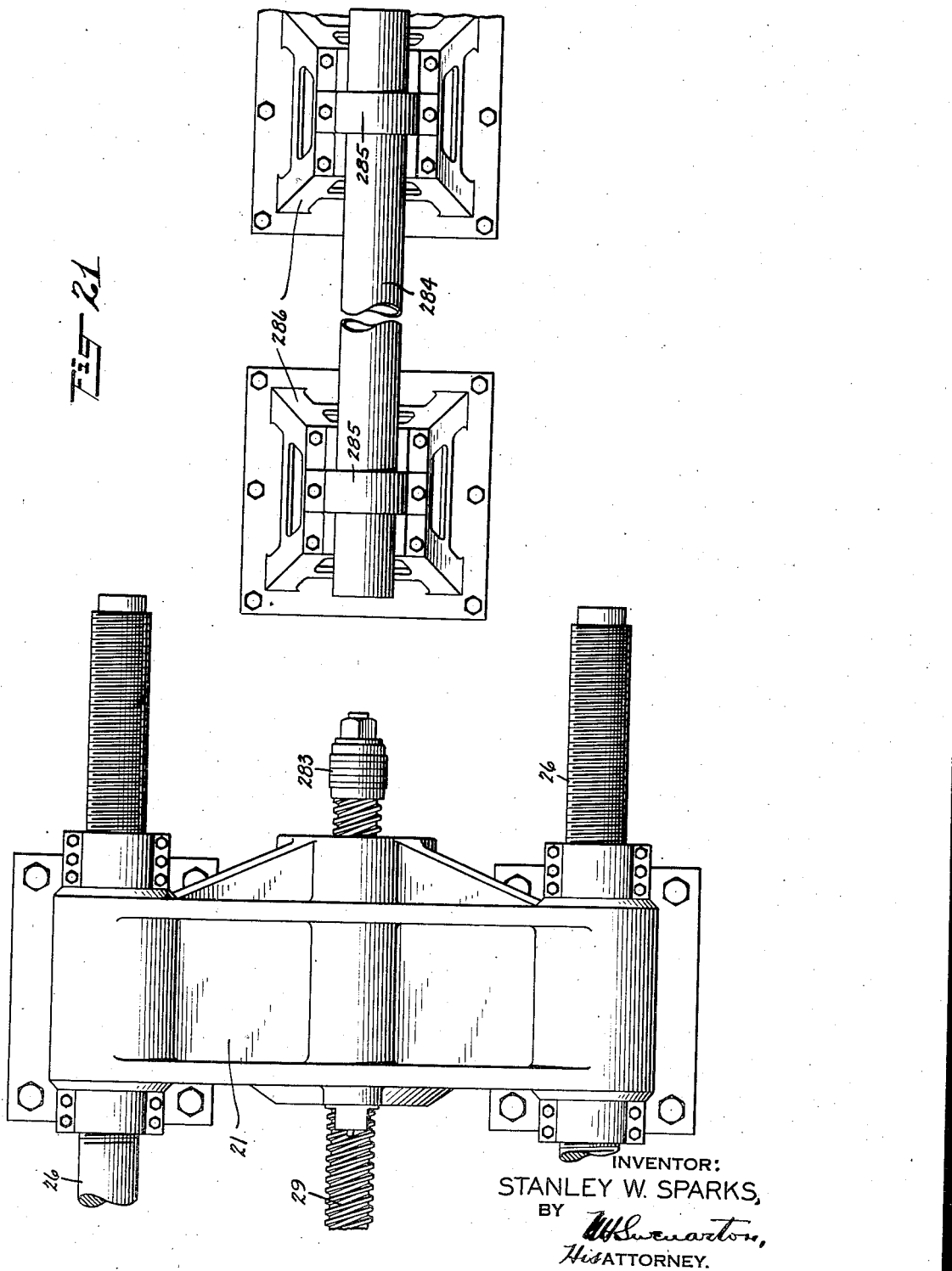

May 28, 1935.  S. W. SPARKS  2,002,966
METHOD OF AND APPARATUS FOR EXTRUDING TUBES AND OTHER ELONGATED SHAPES
Filed Nov. 12, 1932    28 Sheets-Sheet 16

INVENTOR:
STANLEY W. SPARKS,
BY
HIS ATTORNEY.

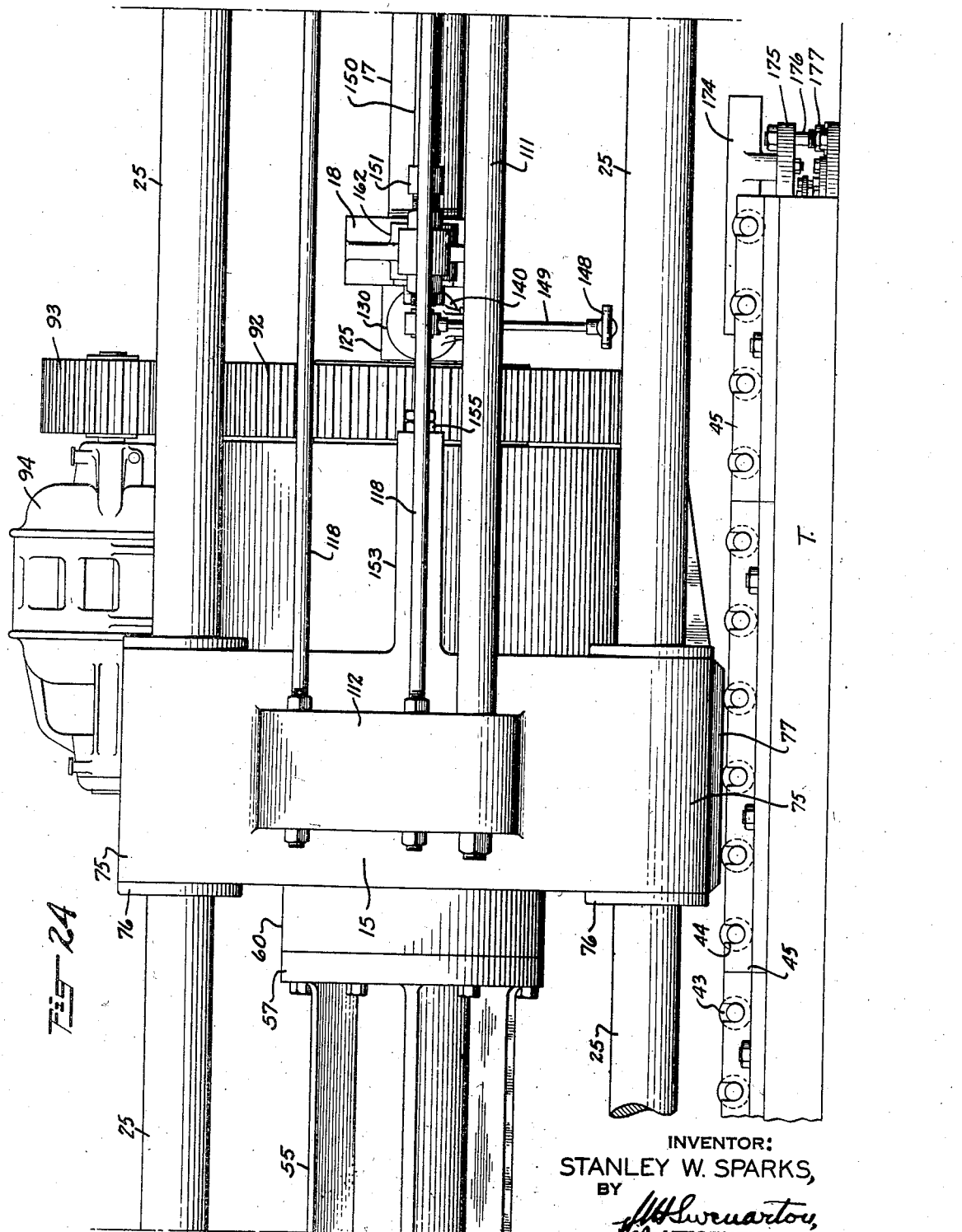

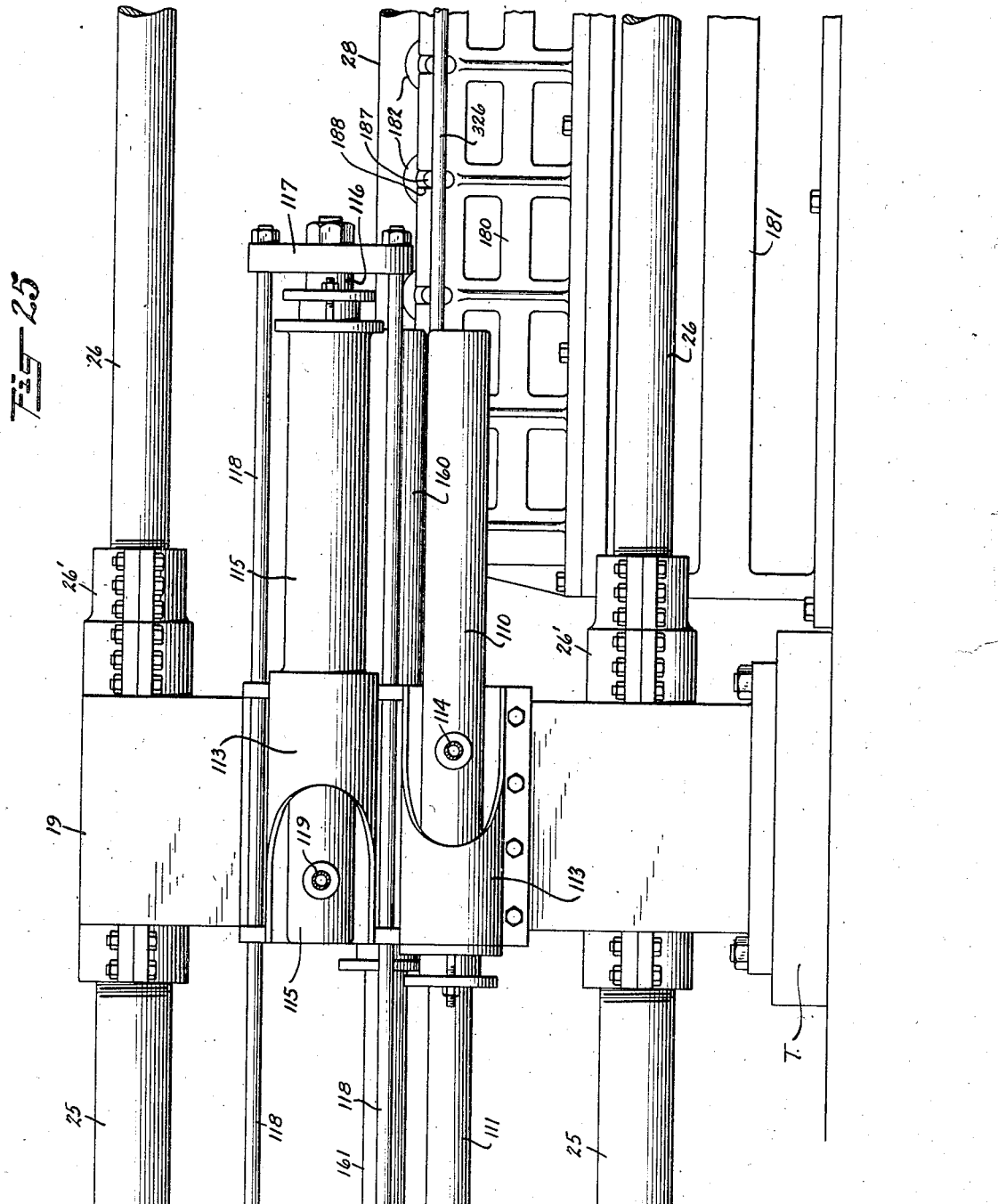

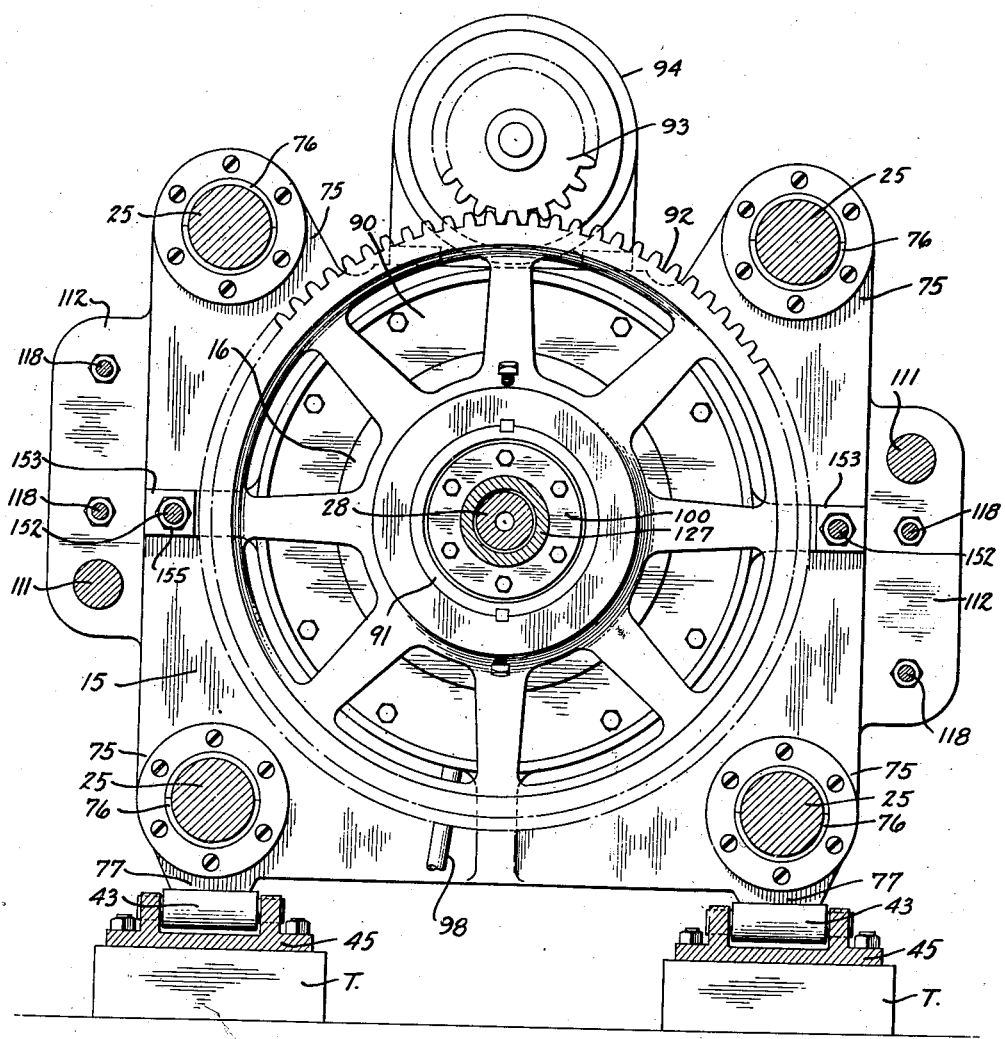

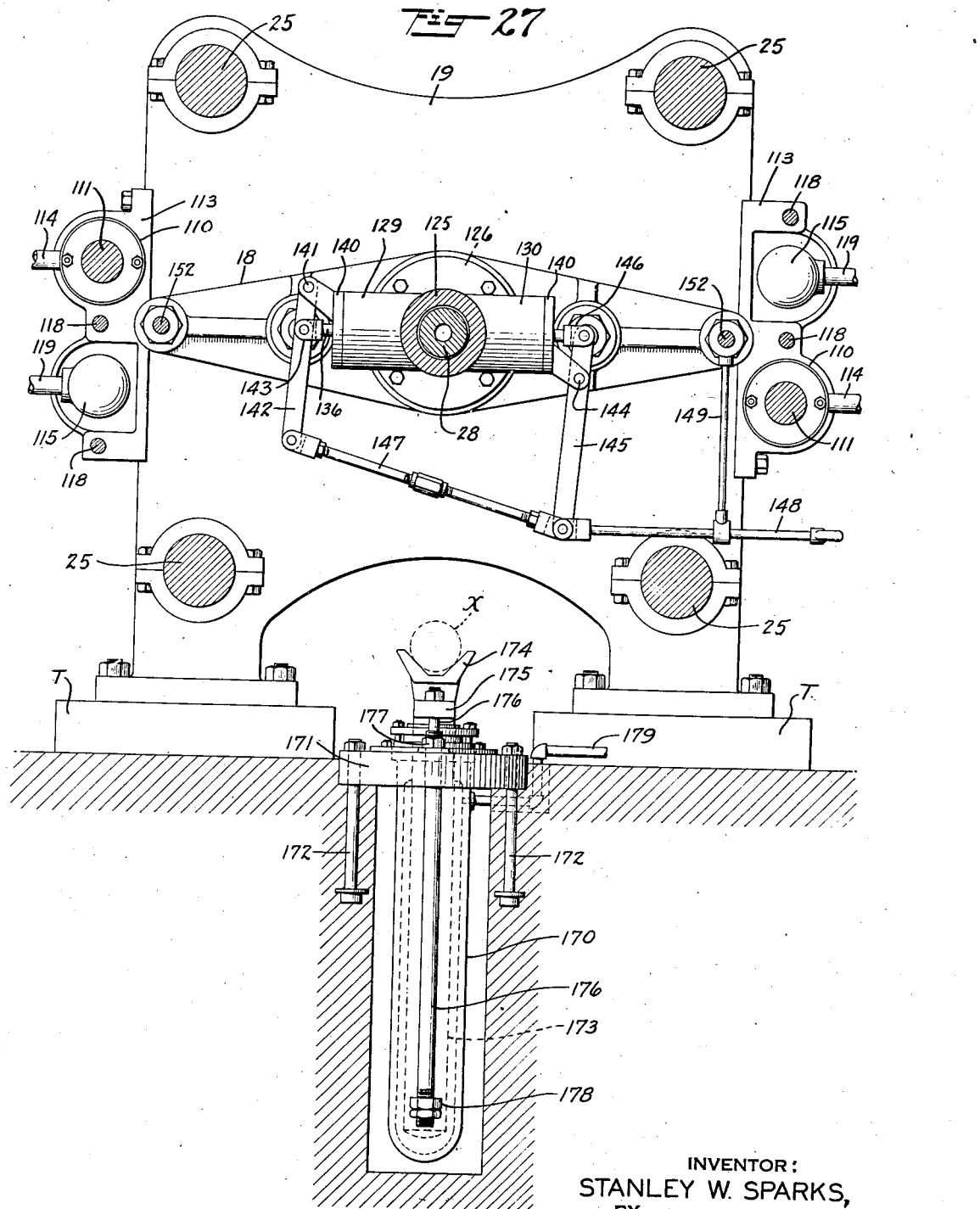

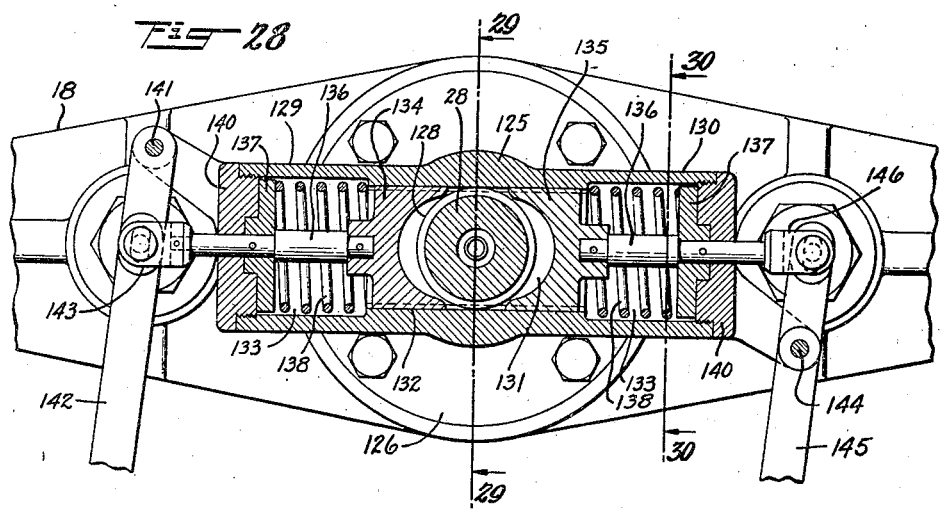

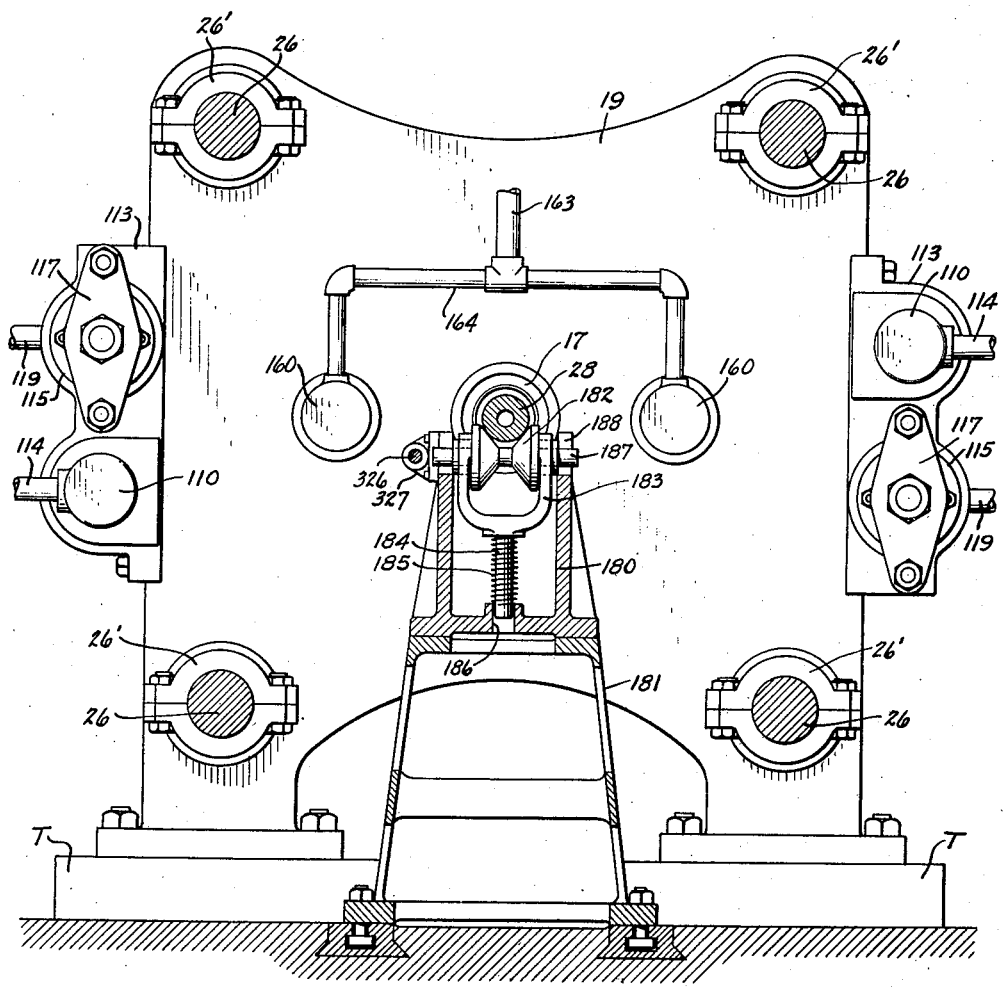

May 28, 1935.  S. W. SPARKS  2,002,966
METHOD OF AND APPARATUS FOR EXTRUDING TUBES AND OTHER ELONGATED SHAPES
Filed Nov. 12, 1932  28 Sheets-Sheet 23
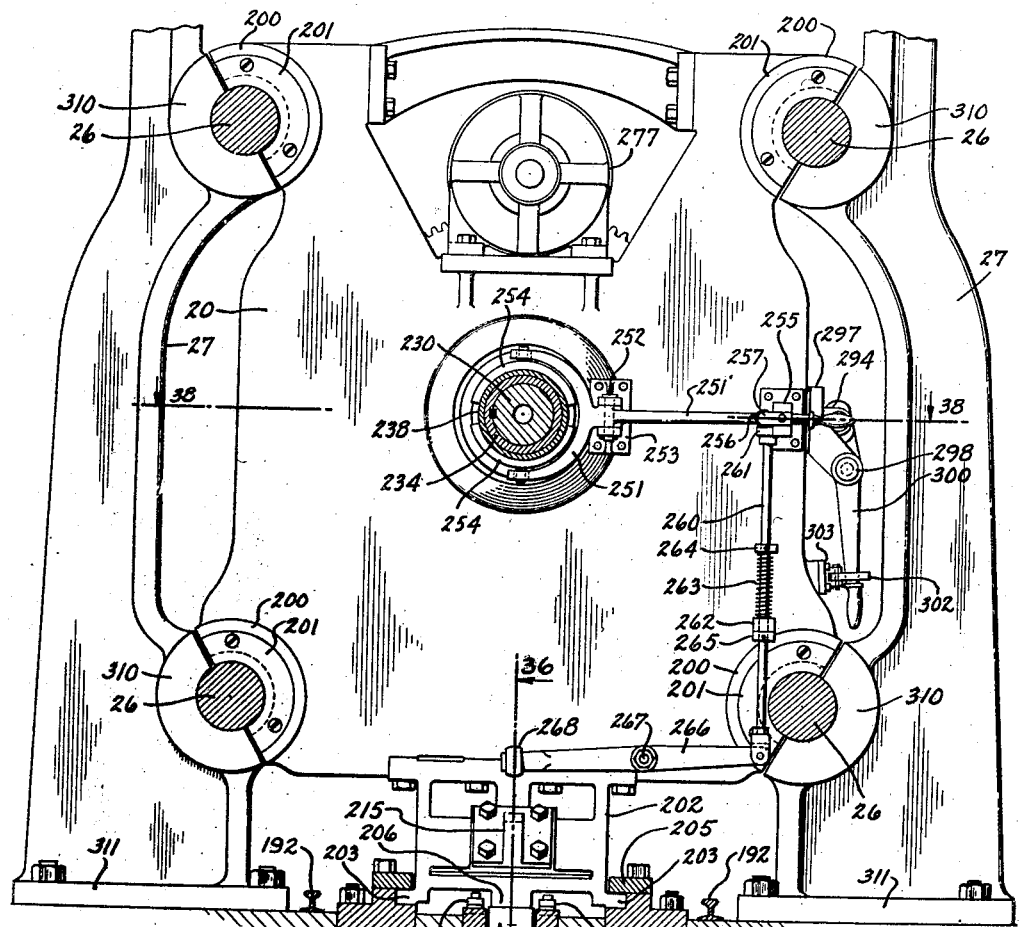
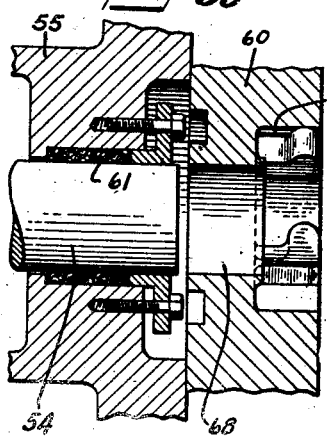
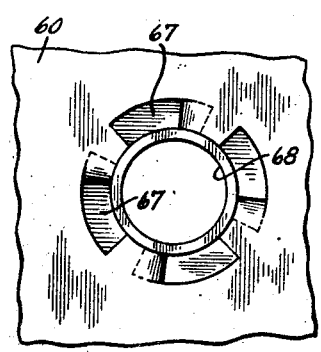
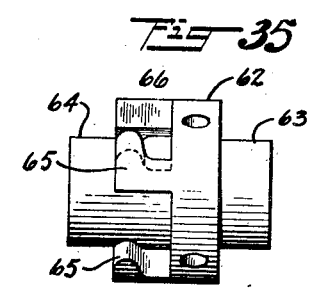
INVENTOR:
STANLEY W. SPARKS,
BY
HIS ATTORNEY.

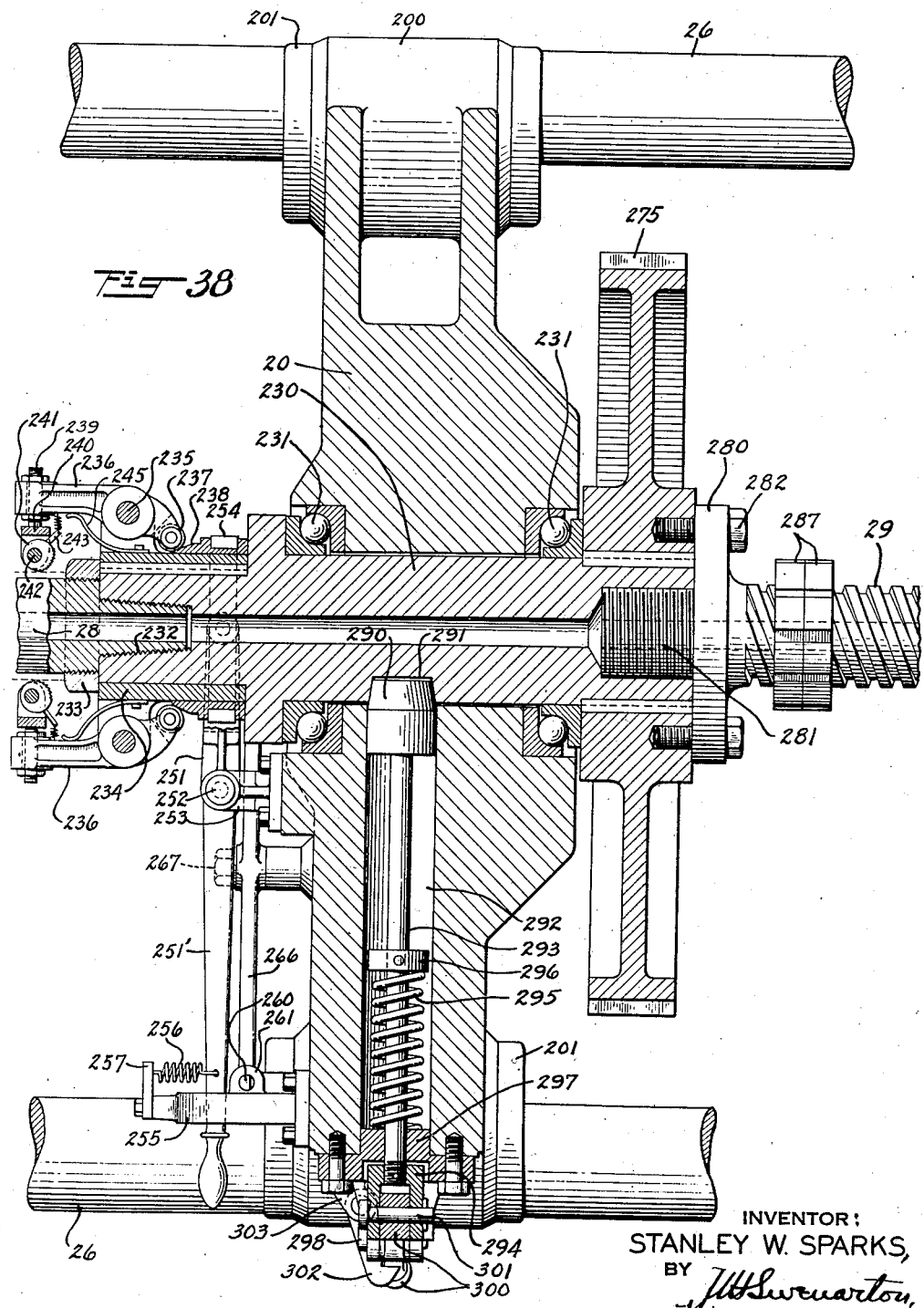

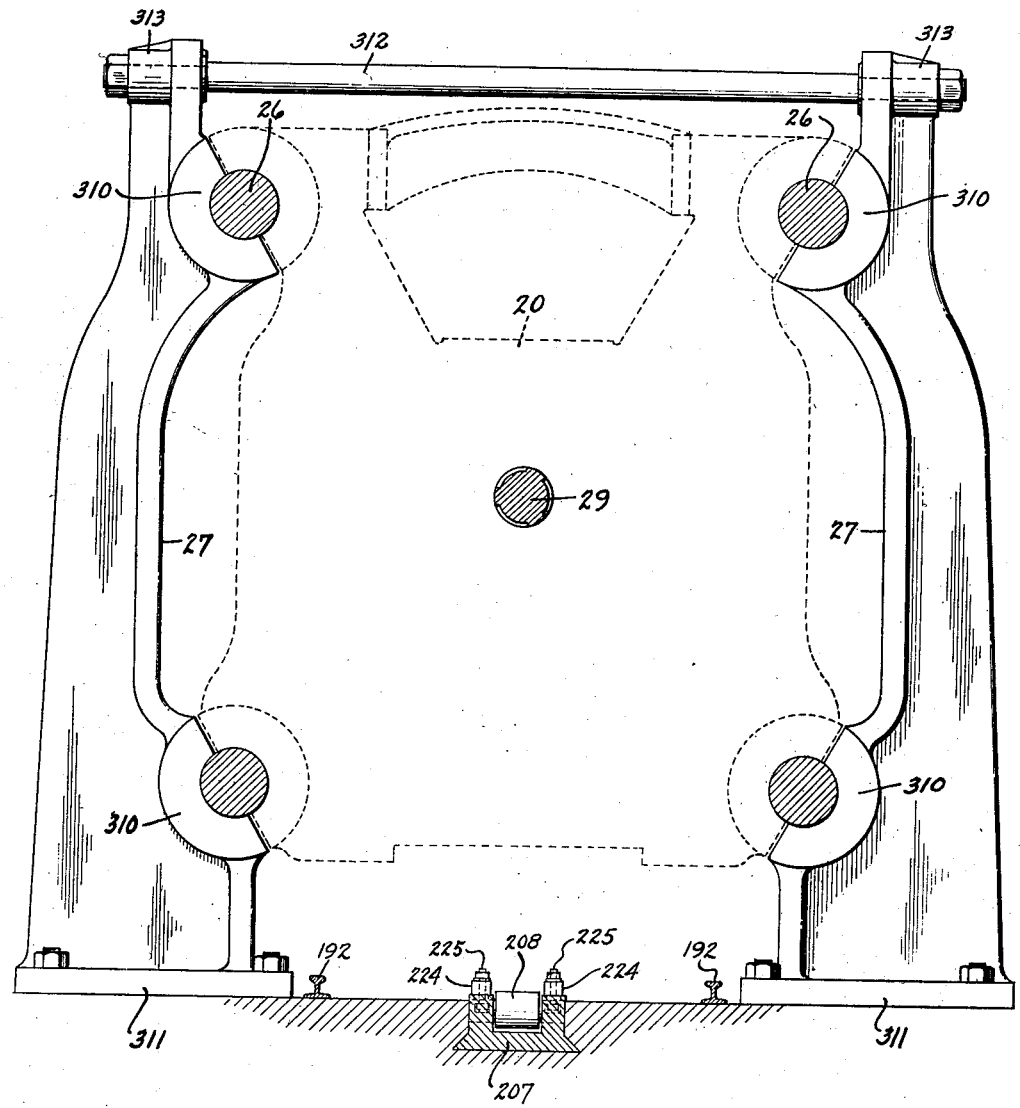

May 28, 1935.  S. W. SPARKS  2,002,966
METHOD OF AND APPARATUS FOR EXTRUDING TUBES AND OTHER ELONGATED SHAPES
Filed Nov. 12, 1932  28 Sheets-Sheet 27
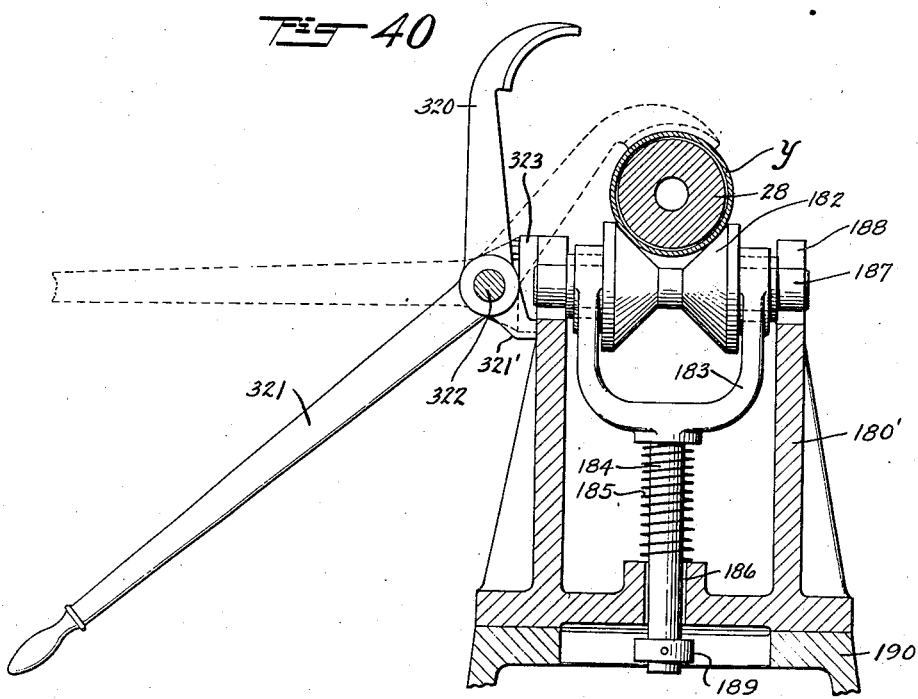
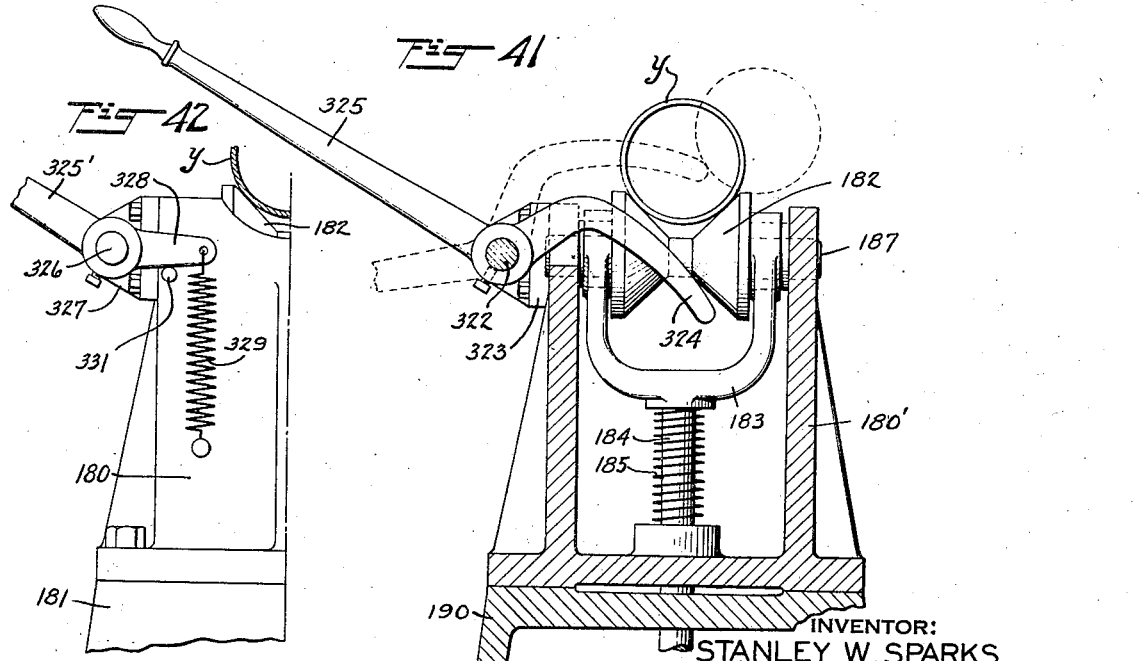
INVENTOR:
STANLEY W. SPARKS,
BY
HIS ATTORNEY.

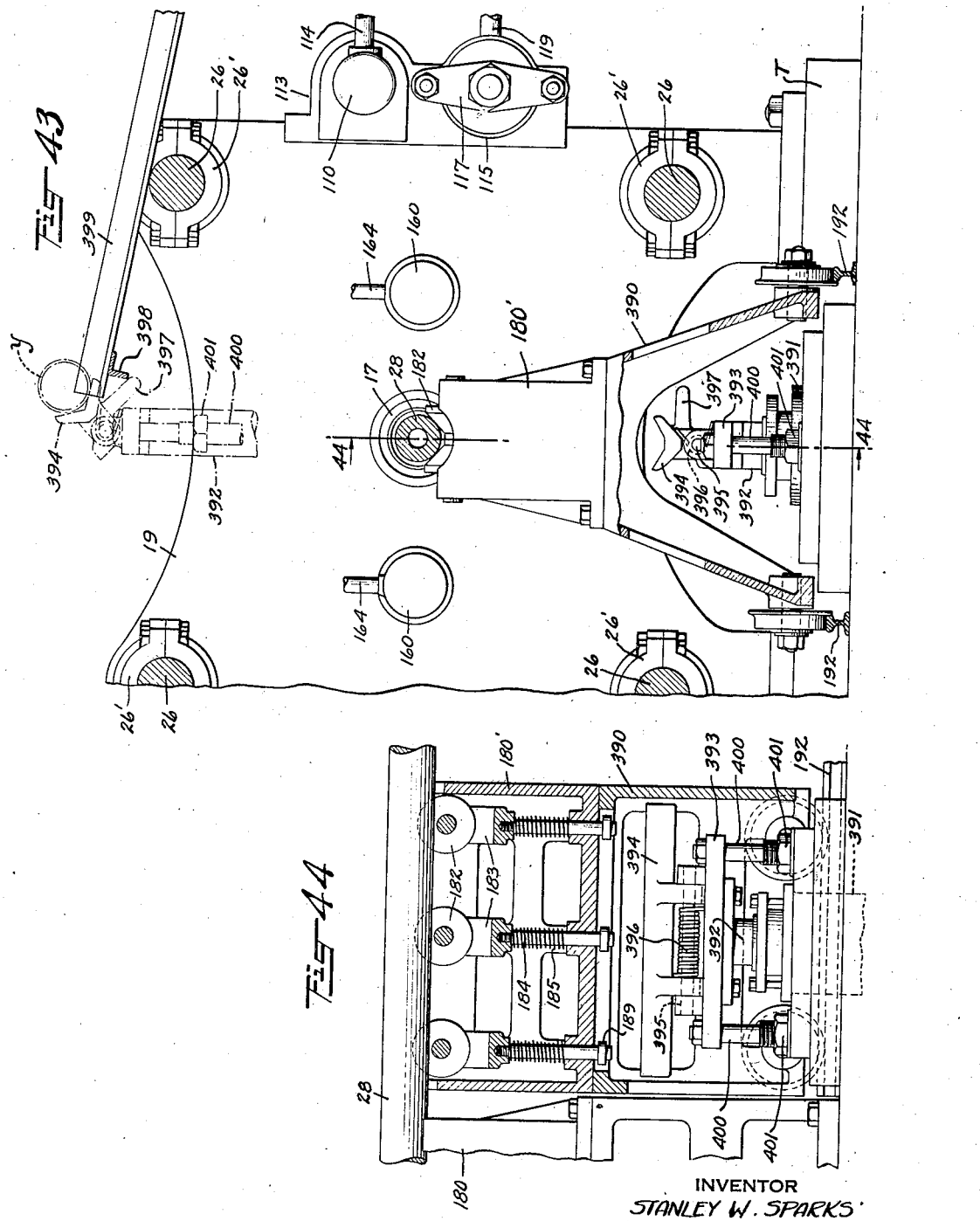

Patented May 28, 1935

2,002,966

UNITED STATES PATENT OFFICE 2,002,966

METHOD OF AND APPARATUS FOR EXTRUDING TUBES AND OTHER ELONGATED SHAPES

Stanley W. Sparks, Norwalk, Conn., assignor to Charles H. Bickell, trustee, representing Metals Research Syndicate, New York, N. Y.

Application November 12, 1932, Serial No. 642,469

7 Claims. (Cl. 207—3)

This invention relates to the economical, high speed extrusion of tubular shapes and has for its especial objects the production of tubular shapes for pressures, mechanical and structural purposes which are of homogeneous thickness and texture, of smooth outside and inside finish and also the complete elimination during the extrusion of frictional loads throughout the length of the die, such as ordinarily occurs when employing an extrusion plunger for pushing a billet through a die, with the consequent reduction to a minimum of the power required for the extrusion operation.

Further objects of the invention are the provision of a self-containing, power-operated apparatus adapted to rapidly produce such tubular shapes from a billet or ingot without the necessity of pre-rolling or other pre-forming of such blank, the interconnected parts of the apparatus being accurately timed and synchronized and under the control of a very small group of operators respectively stationed at different control stations. Furthermore, owing to the extremely low pressures per sq. in., required, for example 20 to 30 thousand lbs. for the extrusion of a 6" pipe of 30 ft. length, having a wall thickness of ½", the metal is not at any time expanded or subjected to stresses beyond its elastic limits at the lowest temperature prevailing during the actual extrusion, with the consequence, that the metal is not subjected to serious tortional or expansional strains during the extrusion operation, and furthermore, no fissures or cracks can exist in the structure of the extruded tubular shape because of the manner in which the same is so extruded.

As a result of the functional differences between the principles involved in the most modern methods of commercial seamless tubing on the one hand and my invention on the other, it is possible when employing my invention to effect very substantial savings in the cost of material, the initial cost of equipment, the labor cost for operation of the compact, self-contained extrusion apparatus, such as hereinafter set forth, as compared with the original cost of equipment and the operating cost of a large modern tube mill, and furthermore there is a very substantial economy in the floor space and the power required, due to the concentration of the operations into a single heating and single extrusion operation and the fact that the major portion of the power employed directly effects the flow of the metal through a very short extrusion annulus, as compared with the overall length of the wall of the entire die or billet-confining chamber.

My invention is more fully set forth and described in the following detailed description and drawings forming a part thereof, in which I have illustrated, as a preferred embodiment of my invention, an apparatus for the making of seamless steel, or other ferrous metal, tubing of various diameters and lengths.

Referring to the drawings:

Figure 1 is a longitudinal diagrammatic cross section of the front portion of the apparatus showing the billet in place in the die or processing chamber ready for the start of the extrusion stroke; and Fig. 1A is a continuation of Fig. 1 showing the rear portion of such apparatus.

Figure 2 is a side elevation of the metal billet employed.

Figure 3 is a longitudinal section of the nubbin.

Figure 4 is a side elevation of the finished tube after cropping the same to remove the forward end which may have possible blemishes from the extrusion operation; and Fig. 5 is a longitudinal section of such crop or forward end of the tube.

Figure 6 is a diagrammatic plan view of Fig. 1 showing, in addition, a diagram of the controlling valves and switches; and Fig. 6A is a continuation of Fig. 6.

Figure 7 is similar to Fig. 1 but showing the position of the various elements of the apparatus at the end of the extrusion stroke with the tube completely formed; Fig. 8 is a similar view but showing the tube withdrawn from the die and the tubular guide and resting on roller guide boxes; and Figs. 9 and 10 are also similar views, the former showing the next step of clearing the tube for recovery by the withdrawal of the forming mandrel and the latter showing the parts in their next position with a new billet in charging position ready for the next cycle of operations.

Figure 11 is a vertical longitudinal section of the main hydraulic power unit in a position corresponding to Fig. 1; Fig. 12 is a continuation of Fig. 11, showing the die and a portion of the forming mandrel with the billet in place ready for the extrusion stroke; Fig. 13 is a continuation of Fig. 12, showing the central thrust block and stationary roller guide box; Fig. 14 is a continuation of Fig. 13, in side elevation, with a portion of the length broken out, showing the traveling roller guide box and mandrel carrying cross-head; and Fig. 15 is a continuation of Fig. 14, in section, showing method of intermediate tie rod support.

Figure 16 is a longitudinal elevation, partly in section, of the rear end of the apparatus, showing the tail stock and traverse screw guard.

Figs. 17 to 21 respectively, are plan views of Figs. 11, 12, 13, 14 and 16.

Figure 22:
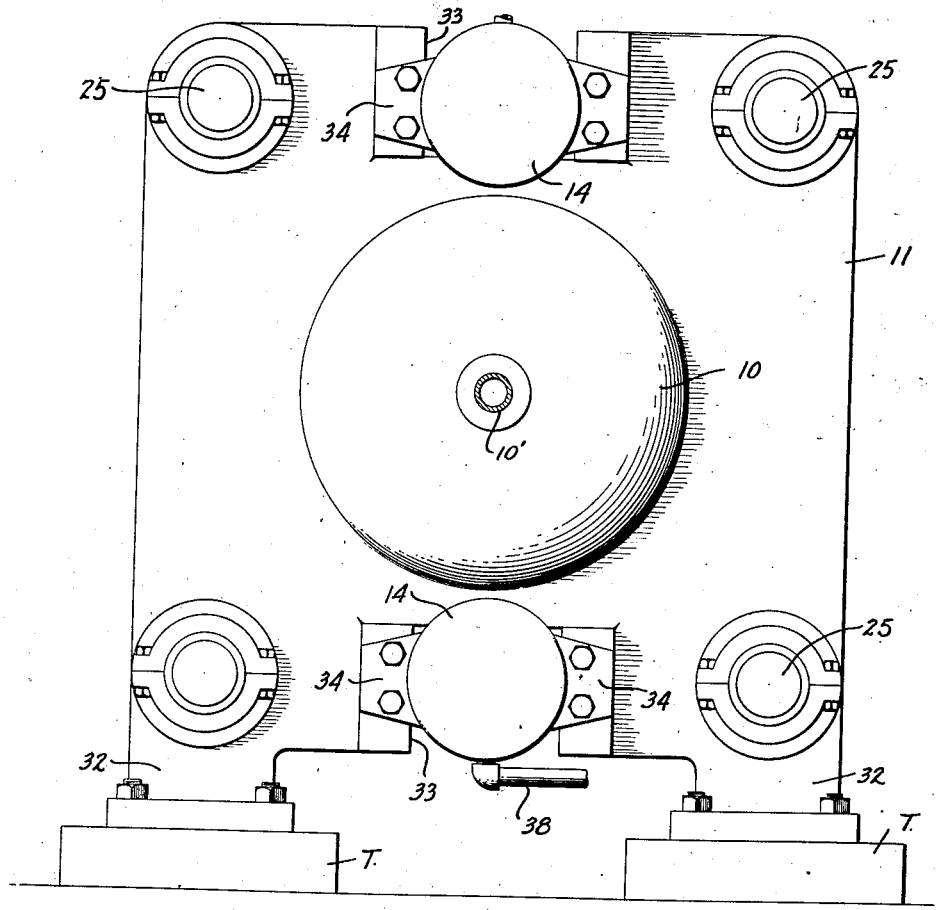

Figure 22 is an end elevation of Fig. 11, showing the main power unit.

Figure 23:
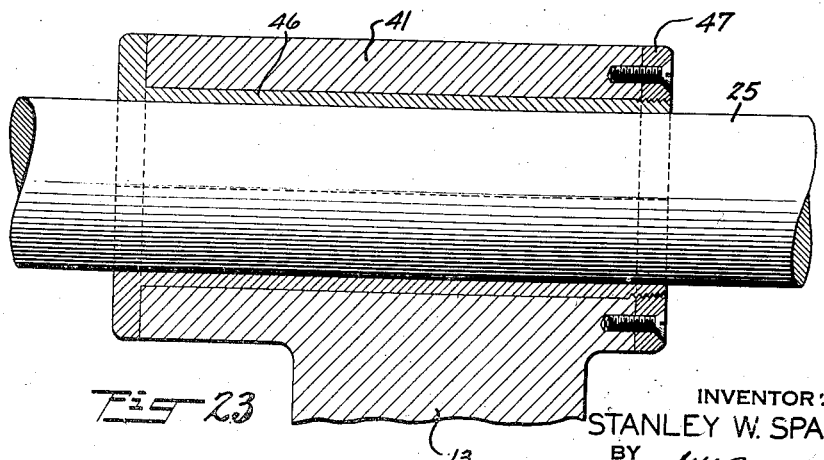

Figure 23 is a section, taken on line 23—23 of Fig. 17, showing a form of interchangeable split bushing.

Figure 24 is a side elevation of Fig. 12, the die portion.

Figure 25 is a side elevation of the central thrust block and stationary roller guide-box shown in Fig. 13.

Figure 26 is a vertical section taken on line 26—26 of Fig. 12.

Figure 27 is a vertical section taken on line 27—27 of Fig. 12.

Figure 28 is an enlarged transverse vertical section of the mandrel centering mechanism.

Figure 29 is a section taken on line 29—29 of Fig. 28.

Figure 30 is a section taken on line 30—30 of Fig. 28.

Figure 31 is a transverse vertical section taken on line 31—31 of Fig. 19.

Figure 32 is a transverse vertical section taken on line 32—32 of Fig. 20.

Figure 33 is an enlarged fragmentary section showing the ejector plunger gland and breechblock retaining recess.

Figure 34 is an end elevation of Fig. 33, viewed from the right.

Figure 35 is a side elevation of the breechblock.

Figure 36:
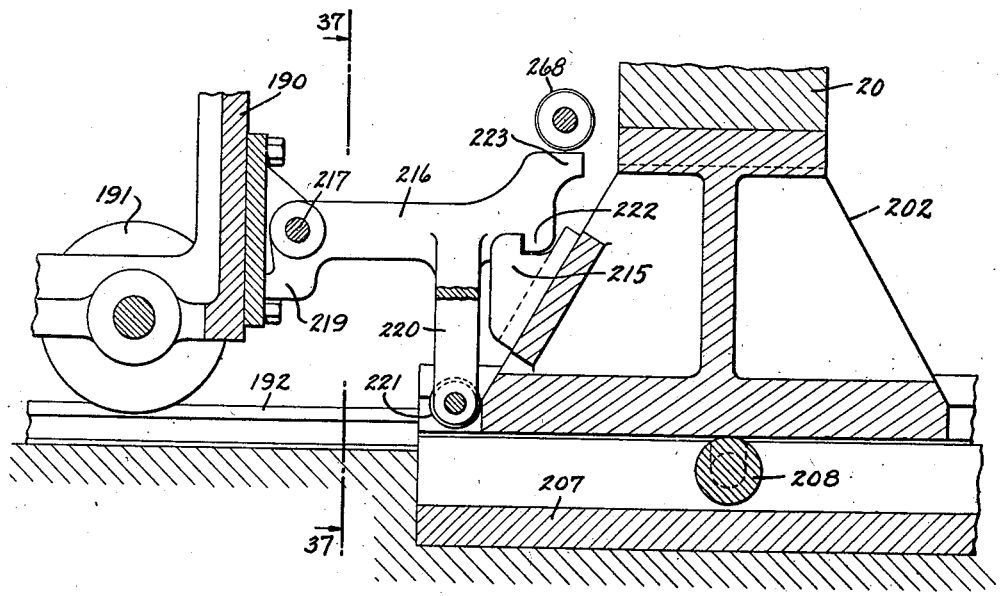

Figure 36 is an enlarged fragmentary section taken on line 36—36 of Fig. 32.

Figure 37:
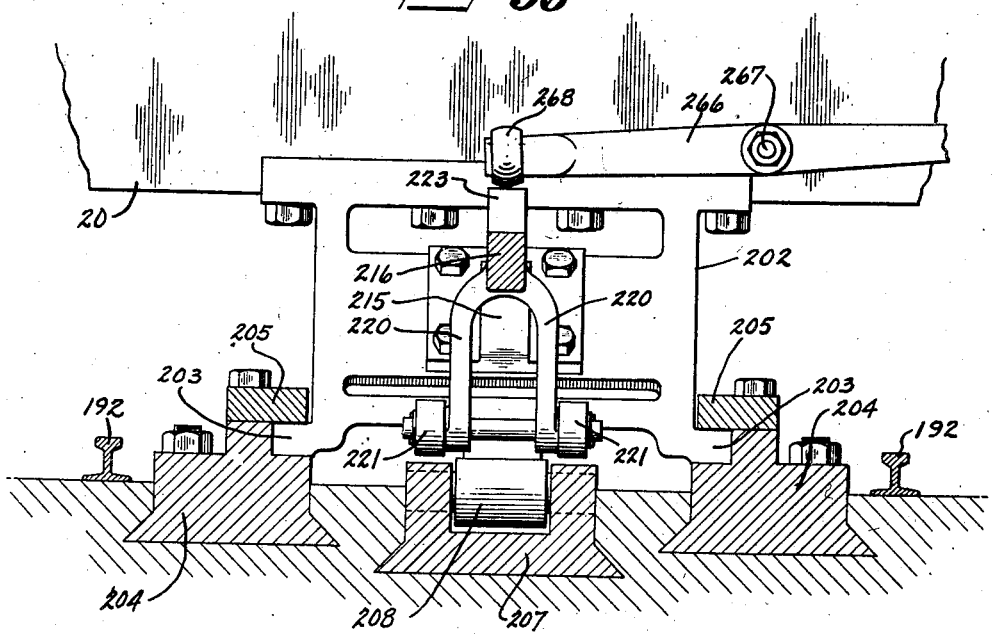

Figure 37 is a section taken on line 37—37 of Fig. 36.

Figure 38 is an enlarged horizontal section taken on the line 38—38 of Fig. 32.

Figure 39 is a transverse vertical section taken on line 39—39 of Fig. 15.

Figure 40 is a fragmentary transverse vertical section, partly in elevation, showing the tube-clamping hand lever.

Figure 41 is a generally similar view but showing the tube-recovery hand lever.

Figure 42 is a fragmentary end view of the roller guide box, showing the spring return means for the tube-recovery lever.

Figure 43 is a transverse section similar to Fig. 31 but showing a modified form of apparatus for recovering the finished tube.

Figure 44 is a longitudinal section taken on line 44—44 of Fig. 43.

Referring to the drawings, and more particularly to Figs. 1 to 6A wherein the general arrangement and construction of the apparatus is shown diagrammatically, Figs. 1 and 1A show in longitudinal section and Figs. 6 and 6A in plan, a self-contained, power driven mechanism, mounted upon heavily constructed foundations T and comprising various sub-assemblies interconnected and associated in functional relationship. These sub-assemblies are arranged in longitudinal alignment and consist of a power unit, die unit, central thrust unit, guiding and supporting units, mandrel operating unit and tail stock or end thrust unit. The power unit and central thrust unit are connected together in proper relation by four heavy steel tie rods 25 while the central thrust unit and tail stock are connected by tie rods 26.

The general assembly is arranged as follows:

A main hydraulic cylinder 10, mounted in a housing 11 anchored to the foundation T, has a plunger 12 mounted therein with its forward end carried by a sliding cross head 13 designed to slide on tie rods 25. Plunger drawback cylinders 14 are provided for returning the plunger 12 to a potential operating position and are carried on main cylinder housing 11.

A die pot or die container 15, carrying centrally therein a rotating die 16, is slidably mounted on the tie rods 25 in a position to be moved forward by an extension or thrust barrel 55 forming a part of the sliding cross head 13. A guide sleeve 17, which serves the dual purpose of mandrel guiding and tube guiding, is provided adjacent the extrusion end of the die 16 and is carried by its own sliding cross head 18. The central thrust block 19, mounted next in line on foundation T forms the anchorage and support for the two sets of tie rods 25 and 26 as well as various hydraulic cylinders to be hereinafter described. Special thrust nuts 26' connect the tie rods 26 to the rear ends of tie rods 25. The opposite or rear ends of tie rods 26 are secured in the tail stock 21 and have intermediate supporting members or stanchions 27.

The mandrel 28 with its removable forming head 28' is rotatably mounted in the reciprocating mandrel cross head 20 and has secured to it at this point the forward end of the traverse screw 29. The rearward end of the traverse screw 29 is in operative engagement with a heavy, stationary nut 30 fixed in the center of the tail stock 21.

Returning now to the power end of the machine, in that a more detailed description of the parts and their operation may be given, and referring particularly to Figs. 11, 17 and 22, the main hydraulic cylinder 10 has the general form of the standard hydraulic press cylinder but with suitable modifications for working in a horizontal position instead of vertically. The housing portion 11 of the cylinder may be integral therewith as shown or may comprise a separate member with the cylinder secured within a central opening therein. The housing 11, as shown, is rectangular in shape with the four corners formed into heavy bosses 31 for the anchorage points of the four tie rods 25 which are securely locked in position therein by split nuts on the tie rods at each end of the bosses 31. The tie rods at this point (as well as at all other points of anchorage) have strong buttress threads cut thereon to enable them to carry the powerful thrust loads of the machine during the extrusion stroke. The two lower bosses 31 have feet 32 formed thereon whereby the housing 11 may be bolted to the foundation T.

The cylinder 10 with its plunger 12 and plunger cross head 13 is single acting, that is, can only be moved forward by admission of water to the cylinder, and therefore requires some means for returning the parts to their original position for the next operation. This is accomplished in the usual manner by drawback cylinders 14 which are rigidly secured to the cylinder housing 11 in recesses 33 formed in the top and bottom of the housing. Laterally extending fins 34 formed on the central portion of the cylinders 14 serve for bolting the cylinder to the housing. The drawback pistons 35 have their piston rods 36 extending forwardly through the usual packing glands and fastened to the cross head 13 at the points 37. Feed pipes 38 enter the forward part of the cylinders 14 for supplying the fluid for the drawback stroke to return the cross head 13 and plunger 12 to their original positions.

Adequate guiding and supporting means for the plunger 12 and for various other mechanism associated with die movement is attained by the special construction of cross head 13, it being substantially rectangular in outline with a heavy, boss-like central section 40, to the rear of which is bolted the plunger 12 by means of its flange 50. The four corners of the cross head are formed into elongated bearing members 41 adapted for sliding on the four tie rods 25. The bearing members 41 have bushings therein both for ease of sliding and for ease of replacement as wear develops. As constructed, these comprise split bushings 46, flanged on one end and threaded on the other, with retainer plates 47 screwed on the latter end and which, when turned down tight, are in turn secured to the bearing members 41 by flat head screws, (see Fig. 23).

Due to the weight of the cross head 13 and associated parts and the necessity for accurate alignment of parts during their movement, it is advisable to relieve the tie rods 25 from carrying all of this weight. This may be accomplished in a number of ways and as shown consists of roller pads 42 formed on the under surface of the two lower bearing members 41 of cross head 13. (See Fig. 11.) A series of rollers 43 carried in grooves 44 formed in roller blocks 45 constitute trackways upon which the cross head 13 is rolled and whereby most of its weight is transmitted to the foundations T (upon which roller blocks 45 are mounted) instead of to the tie rods 25.

At the conclusion of the extrusion stroke, the nubbin end and a considerable length of finished tube are still within the die and must be withdrawn forwardly for recovery. To assist in this movement of the tube out of the die, which is then stationary, an ejector mechanism has been provided, the cavity 51 within the plunger 12 being utilized for its location. Such ejector mechanism consists of a hydraulic cylinder 52, a plunger 53 operating within the cylinder through a bushed and packed gland in the forward end of same and a reduced forward extension of the plunger constitutes the ejector ram 54. A supply pipe 70 communicates with the cylinder 52 through an enlarged hole 71 in the wall of the cylinder 12. The ejector ram 54 projects forwardly through a thrust member or barrel 55 fixed to the central section 40 of the cross head 13 by means of a flange 56 and cap screws. The internal bore 58 of the barrel 55 is substantially larger than the ram 54 and has at its forward end a packed gland 61 through which the ram 54 passes. This internal bore 58 constitutes, with its feed pipe 59, a hydraulic cylinder for the return of the plunger 53 and ram 54 to their original position after an ejection stroke. (See Figs. 11 and 12.)

In transmitting the power of the main hydraulic cylinder 10 into forward movement of the die to perform the extrusion, a mechanism is provided to make the proper thrust contact with the die container 15 and at the same time close the breech opening of the die 16 during the extrusion stroke, withal being adapted for immediate separation from the die container and breech of the die. Referring more particularly to Figs. 12, 33, 34 and 35 this mechanism comprises a thrust block 60, secured by cap screws to a flange 57 on the forward end of the thrust barrel 55, and adapted to make a close contact with a recess in the end of the die container 15. The thrust block 60 is counterbored slightly on its forward face to allow clearance about the projecting end of the rotating die 16. Thus it will be seen that, as the die container and die are moved forward by the power stroke, there is no frictional contact between the rotating die 16 and the non-rotating thrust block 60. The thrust of the die 16 is taken up in a manner to be hereinafter described. The backward thrust of the billet X towards the breech of the die as the extrusion stroke progresses is taken by a breech plug 62 carried in the central part of thrust block 60 in such a manner as to be non-rotatable during the power stroke. This construction reduces to a minimum the frictional contact between the rotating die and billet and the non-rotating thrust block and breech plug as well as placing the wear due to this contact upon a cheap, easily renewable and non-accurate machine part.

The mounting of the breech plug 62, as shown more particularly in Figs. 12 and 33—35, is such as to properly center it, prevent its rotation, retain it within the thrust block 60 as the latter moves away from the die and to render it easily and quickly manually replaceable while hot. The construction to attain these features consists of forming the plug 62 with an enlarged central portion, the front part of which is disc shape with four equally spaced L shaped hooks or bayonet lugs 65 projecting backwardly from its rear face and joined to the reduced hub section just back of the disc portion. These bayonet lugs 65 are adapted to enter and, upon a slight turn of the plug 62, lock themselves within similarly formed cavities 67 in the thrust block 60. A guide boss 64 formed on the rear of plug 62 rests within the bore 68 of the thrust block 60 and serves to center and support the plug while the bayonet lugs are being engaged. Spanner wrench holes 66 are provided in the periphery of the breech plug to facilitate its handling and placing while hot. Extending forward from the disc portion of the breech plug 62, is a thrust boss 63 which contacts directly with the billet X by projecting into the bore 103 in the rear portion of the die 16. The disc portion of the plug lies within the counterbore 104 in the rear face of the die 16 and with the thrust boss 63 in the bore 103, serves as a seal against possible flashbacks of hot gases.

Referring more particularly now to Figs. 12, 18, 24 and 26, wherein is shown the die and its associated parts, it will be seen that the die container 15 is primarily a strong, heavily ribbed, cylindrical body especially bored for carrying the rotating die 16 and having four radially placed bearing bosses 75 for mounting the container upon the tie rods 25 for reciprocation thereon. Split bushings 76, similar to those employed in the cross head 13, are provided for ease of replacement after frictional wear and roller pads 77 are formed on the two lower bosses 75 where they ride on the rollers 43, previously described, to carry most of the weight of the die container and associated parts.

The die container 15 has in its forward half a substantially cylindrical bore 78 followed by a sharply tapered bore 79 which merges into a smaller cylindrical bore at the entrance to the container. In the cylindrical bore 78 are placed radial roller bearings 80 whose outer races 80' are pressed or otherwise secured in the said bore. A ball thrust bearing 81 with tapered outer raceway 81' is mounted within the tapered bore 79 of the container to carry the extrusion thrust of the die 16 on the power stroke.

The die 16, which is carried within the container 15 so as to be rotated during the extrusion operation, is of the solid type preferably being of special Vanadium die steel alloy to withstand the high pressures and temperatures involved in the extrusion process of steel tube formation. The main section 85 of the die is cylindrical and is carried on the roller bearings 80. A tapered portion 86 follows where the great thrust pressures are transferred to ball thrust bearings 81 and thence to the die container. The tapered part 86 then changes into a reduced cylindrical part 87 to form the end of the die wherein the bore 103 and counterbore 104 receive the breech plug 62. The opposite end of the die has formed thereon a flange 88 whereby, by means of a retaining plate 90 bolted to the die container and interposed ball bearings 89, the die is held within the container when the thrust is forward during the tube ejecting operation.

The means for rotating the die 16 within the container comprises appropriate gearing and an electric motor carried by the container. As constructed, the die 16 has a hub 91 projecting from its forward face upon which is keyed a large, heavy-duty bull gear 92 which meshes with a motor pinion 93 on the shaft of a motor 94, the latter being carried on a pad formed on the top of the die container. This arrangement gives a compact, sturdy and direct drive between motor and die without recourse to splined or sliding shafts to accommodate the reciprocation of the die while the same is rotating.

The die 16, in carrying the hot plastic billet, must itself be maintained at a relatively high temperature so as not to chill the billet to any great degree during extrusion. At the outset the die is pre-heated by placing one or more heated billets therein without running through the extrusion operation. However, as the temperature of the die if uncontrolled would soon become too great and injure the mechanism, it becomes necessary to keep the temperature within a desired limit. To accomplish this in the mechanism shown there is provided a cooling and lubricating system for the rotating die which consists of an entrance pipe 95 for the cooling medium and a port 96 connecting the pipe 95 with the space between the container and die partially occupied by the roller and ball bearings 80, 81. The cooling medium, after circulating around the bearings and die, finds its way to an exit port 97 and return pipe 98 and thus to a pump (not shown) for cooling and recirculation. Packing glands 99 and 99' at each end of the die serve to retain the circulating coolant within its proper channels.

Due to the particularly hard service to which the interior of the die is subjected the mechanism has been arranged so that this portion may be replaced as wear develops without dis-assembling the main part of the die and container. The same feature also permits of the machine being used for making various sized tubes. The construction consists of a comparatively heavy bushing or liner 100 fitted into the central bore of the die and bolted in place by means of its flanged end which is set into a recess 101 in the hub 91 of the die 16.

It will thus be seen from the foregoing description that a die mechanism has been designed which is compact, strong, provided with cooling and lubricating systems, has quickly interchangeable parts at points of great wear, has simple self-contained means of rotation with heavy thrust pressures properly provided for, while the mechanism as a whole is adapted to be pushed forward, with the die rotating, over and about a properly placed mandrel in such a manner as to extrude the metal of the contained billet through the space between the interior wall of the die liner and the nose of the mandrel to form a tube. It will also be noted that in the type of extrusion employed herein, the mandrel is stationary and the die and billet move towards and over it and consequently the only friction developed due to extrusion is confined to the comparatively small area consisting of the front face of the mandrel nose and the short forming periphery of the mandrel and the adjacent wall of the die liner. This feature thus means that the very minimum of power for extrusion is required since most of the power is devoted to actual extrusion and not to over-coming excessive frictional loads along the sides of a die throughout its entire length as occurs when an extrusion plunger is employed to propel the billet through a die.

As described so far the die unit is movable forward by the main plunger 12. Its necessary return to original position for the next operation is provided for by placing a pair of push-back cylinders 110 on the central thrust block 19 and connecting their piston rod extensions 111 to lugs 112 formed on either side of the die container 15. Supply pipes 114 carry the power fluid to cylinders 110. Brackets 113, which form the medium of attachment for cylinders 110 to the central thrust block 19, also carry another pair of cylinders, draw-forward cylinders 115. The piston rods 116 from these cylinders project forward and have attached to their ends cross heads 117. Leading back from these cross heads 117 are a pair of pull rods 118 which are attached to the same lugs 112 on the die container 15 as the push rods 111. These draw-forward cylinders 115 move the die unit in the same direction as the main plunger 12 and hence are only used as sources of possible additional power if needed or to move the die during repair of the machine when the great power of the main plunger is not needed. Supply pipes 119 convey the power fluid to the cylinders 115 (see Figs. 19 and 24).

It is of course to be understood, that the various pipe and cable connections running to reciprocating parts are constructed in the usual flexible manner or provided with flexible joints well known in the art and hence are not shown in detail in the drawings.

The guide sleeve cross head 18 with its associated parts and the forward part of the mandrel 28 with its guiding means will now be described wherein reference to Figs. 12, 13, 18, 19, 24, 27, 28, 29 and 30 should be made. In starting the extrusion stroke, it is essential that the nose of the mandrel 28' (which is the forming section) be held accurately concentric within the mouth of the die so that the space between the nose and the die wall makes a perfect cylindrical cavity through which the initial few inches of the advancing tube are to be forced. This centering of the mandrel nose within the die is initially accomplished by manually actuated mechanical means, although power may be used, and such means is released as soon as the advancing tube reaches the centering device. Any further external holding of the mandrel is unnecessary since its rounded nose and the revolving billet create the necessary centering forces.

The mechanical embodiment of the centering device consists of a central cylinder 125 lying along the main axis of the machine and attached to the cross head 18 by its flange 126. A reduced nose portion 127 is adapted to seat within a counterbore 102 in the die liner 100 for the purpose of accurately aligning the mechanism with the mouth of the rotating die 16. This construction also excludes air from the extrusion cavity so that the formation of scale is practically eliminated at the area of tube formation. The internal bore 128 of the central cylinder 125 is slightly larger in diameter than the tube being made because it is only to act as a guide and support for the tube and not for determining its size. The bore 128 continues forwardly through the cross head 18 and into and through the guide sleeve 17 which is screwed into the cross head 18 and passes through a bushed central bore in the central thrust block 19. Extending laterally from the sides of cylinder 125 are two centering block cylinders 129, 130, in alignment with each other and at right angles to the axis of the machine and it is within these cylinders that the opposed mandrel centering blocks 134 and 135 reciprocate, one on each side of the mandrel.

The two centering block cylinders 129, 130 and their contents are duplicates of one another so that a description of one will suffice. The inner end of the cylinder, which communicates with internal bore 128, has a vertically rectangular hole 131 therein with a keyway 132 formed in the top and bottom walls. The mandrel centering blocks 134, 135 are slidably fitted into these holes 131 and have a tongue on their upper and lower surfaces to cooperate with the keyways 132. The outer end of the cylinder is a cylindrical bore 133 wherein is carried centering block retracting means. The centering blocks are concave on the inner side and when brought together form a hole whose diameter is substantially equal to that of the mandrel. To the outer side of the blocks is attached a stem 136 whose other end is outside the cylinder and carries a fork 143 for attachment to an operating lever. Midway on the stem 136 is an abutment disc 137 between which and a shoulder formed between circular bore 133 and rectangular bore 131 is a compression spring 138 whose purpose is to move the centering blocks 134, 135 away from the mandrel. Fulcrum plates 140 screwed into the ends of cylinders 129, 130 form the stop members for limiting the outward movement of the blocks.

Referring now to Fig. 27, wherein is best depicted the leverage system for actuating the centering blocks 134, 135, it will be seen that the fulcrum plates 140 although identical in construction are so placed that their fulcrum pivots are on opposite sides of the central horizontal plane of the machine. Fulcrum pivot 141, located above the center, carries the lever 142 to which is pivotally connected, midway of its length, the stem 136 of block 134. Fulcrum pivot 144 located below the center, carries the lever 145 at a point midway of the lever's length. The upper end of lever 145 is pivotally connected by a fork 146 to the stem 136 of centering block 135. The two levers 142 and 145 both extend below the center plane of the machine and are connected by a rod 147. A hand lever 148, connected to the lower end of lever 145 and supported in a sling 149, projects outside the operation area of the machine and within reach of an operator. From the foregoing description it will be seen that as the operator pulls the hand lever 148 outwardly the two centering blocks will be moved towards each other (due to levers 142 and 145 not being of the same class) and will grip the mandrel to rigidly hold it to its axial alignment. As soon as the extrusion stroke is well under way, the hand lever 148 is released, or its release forced by the advancing metal contacting with the beveled forward edges of the centering blocks, and the springs 138 then retract the blocks out of the path of the tube being formed.

The sleeve cross head 18 is equipped with appropriate guiding and propelling means and various stop members for both itself and the die. A pair of guide rods 150 are attached to the ends of the cross head 18 and extend backwardly (to the right in Fig. 18) where they are slidably mounted in the central thrust block 19 and of such a length as to allow the cross head its full movement. Rods 150 have extension 152 thereon which project from the cross head towards the die unit to act as stop members for limiting the movement of the cross head towards the die. Adjustable stop nuts 155 on extensions 152 allow for the accurate control of this movement. The die container 15 is equipped with lugs 153, in longitudinal alignment with extensions 152, containing drilled holes 154 for the reception of the ends of said extensions which may project beyond the position of the stop nuts 155. Stop collars 151 are also placed upon rods 150 between the cross head and the central thrust block 19 to limit the movement of the cross head in that direction. The means for moving the cross head 18 consist of two single acting hydraulic cylinders 160 mounted in the central thrust block. The piston rods 161 have their ends attached to bosses 162 on the cross head. A common supply pipe 163 divides into two lines 164 one running to each cylinder so that uniformity of movement of the two cylinders 160 is obtained. From the foregoing it will be seen that cross head 18 is moved towards the die unit by cylinders 160 until stop nuts 155 contact with lugs 153. The return movement of the cross head is coincidental with the forward movement of the die by main plunger 12 and this movement which is the extrusion stroke of the machine, is limited by the stop collars 151 as they strike against the central thrust block 19.

It is desirable to charge the heated billet into the mouth of the die as quickly as possible after it leaves the furnace both to retain it at its critical temperature and to limit the formation of scale to a minimum. This may be done by a sling and crane from above but a quicker, more accurate and more efficient method is shown wherein a hydraulic billet elevator is used. (See Figs. 12, 27.) This comprises an elevator cylinder 170 mounted on a base plate 171 and set into the floor directly beneath the axis of the machine in proper relation to the mouth of the die where it is held by anchor bolts 172. To the upper end of the elevator plunger 173 is attached a rectangular plate 175 upon which is bolted a V-shaped cradle 174 to carry the cylindrical billet X. Two guide rods 176 depend from the plate 175 and pass through the base plate 171. Stop nuts 177 placed on the rods 176 above base plate 171 limit the downward movement while stop nuts 178 beneath the base plate limit the upward movement and bring the billet to the axis of the machine and adjacent the mouth of the die. The billet is then pushed from the cradle 174 into the die by the advancing mandrel, the movements of which will be described later. Supply pipe 179 brings the power fluid to cylinder 170.

The guiding and supporting means for the mandrel and for the tube during its formation will now be considered (see Figs. 13, 14, 19, 20 and 31). The same mechanism serves both the mandrel and the tube and is composed of two parts, one stationary and the other longitudinally movable to accommodate the shifting position of the parts. The stationary part comprises a skeleton roller support box 180 which is mounted upon a table 181 and carries a plurality of freely movable, V-shaped rollers 182 at spaced intervals just beneath the main axis of the machine. These rollers 182 are journaled in U-shaped brackets 183 having a depending central stem 184 which projects through a guide hole 186 in the box 180. A compression spring 185 placed on the stem between the bracket 183 and the box 180 carries its share of the load of either mandrel or tube or both which may be resting on the rollers and at the same time allows the position of the roller to vary as the mandrel or tube displace one another along the line of action. The trunnions 187 of the rollers extend laterally beyond the bracket 183 and rest in slots 188 formed in the sides of the box 180, serving to keep the roller in proper alignment. Immediately to the rear of the stationary roller box 180, is the traveling roller guide box 180' which is similar to the box 180 in all respects except that instead of being mounted upon a table it is bolted to a carriage 190 having four wheels 191 adapted to ride on tracks 192. The purpose of this construction is to insure a support for the end of the tube as it is withdrawn from the die and sleeve by the receding mandrel cross head 20 to which the traveling guide box is releasably attached, to be described later.

Considering now the mandrel-carrying cross head 20 (see Figs. 14, 32, 36, 37, 38) within which is rotatably mounted the rear end of the mandrel 28. This consists of a rectangular platen with each of the four corners formed into half bearings 200 into which are set, and secured by screws, double flanged half bushings 201. The cross head is slidably mounted on the tie rods 26 with the split plane of the bearings 200 inclined from the vertical in such a manner that the top of the bearings overlies to a considerable extent the top of the tie rods. The purpose of the half bearing construction is to allow the cross head to slide past a plurality of intermediate tie rod support stanchions 27 to be described later. For carrying most of the weight of the mandrel cross head and also to assist the tie rods in maintaining its position under the tortional and buckling strains set up during the extrusion stroke, there is provided a sliding guide shoe 202 bolted to the under side of the cross head and having laterally extending wings 203 on its lower surface. These wings 203 ride in grooves formed in a pair of guideways 204 which are set in the foundation on each side of the axial plane and between traveling guide box tracks 192. Retainer strips 205, bolted to guideways 204, complete the groove for carrying the wings 203. A series of rollers 208, arranged along the axial plane and journaled in boxes 207 set into the foundation, carry the main weight of the cross head through the roller pad 206 formed on the under surface of slide shoe 202.

At the completion of the extrusion stroke, the tube which has just been formed comes to rest with its forward end immediately adjacent the mandrel cross head 20 and resting on the traveling guide box 180'. As the mandrel and tube move towards the tail stock to withdraw the tube from the die, it is necessary to also move the guide box 180' so that the end of the tube will still have its support, but after the tube has been ejected from both the die and the sleeve and the mandrel withdrawal is about to take place, it is no longer necessary to continue to move the guide box. The means for automatically moving and stopping the box consist in releasably hooking it to the mandrel cross head by a latch bracket 215, which is bolted to the forward side (shown at left of Fig. 14) of the slide shoe 202 and to a latch bar 216 pivotally attached at 217 to a bracket on the guide box 180'. A stop lug 219 on the latch bar 216 prevents it from dropping out of position when it is released from the latch bracket 215. A hook 222 on the end of latch bar 216 cooperates with a similar hook on the latch bracket 215 to form the actual connection between the box 180' and the cross head. The means for releasing the box from the cross head at predetermined points comprise a pair of cam rollers 221, mounted on the lower end of a forked member 220 carried by the latch bar 216, and a pair of stationary cams 224 adjustably attached to the top runs of roller journal box 207 at the point where release is desired. Tee bolts 225 carried in slots 226 formed in the journal box serve to secure the cams 224 in their proper positions (see Figs. 15 and 39). From the foregoing it will be seen that as the mandrel cross head recedes towards the tail stock, the traveling guide box is drawn with it until the cam rollers 221 meet the cams 224, thereby causing the latch bar 216 to be lifted and the hook 222 detached from the bracket 215. The guide box comes to rest at this point while the cross head continues to move rearward to the end of its travel and with the consequent clearing of the mandrel from the tube. On its return, the cross head again picks up the guide box due to the beveled forward edge of the bracket 215 meeting and raising the hook 222 until it drops into its place to again lock the box to the cross head.

The gripper mechanism for temporarily attaching the formed tube to the mandrel cross head 20 so as to withdraw it from the die and sleeve will now be described (see Figs. 14, 20, 32 and 38). The mandrel 28 is mounted within the cross head 20 by means of a short stub shaft 230 having combined ball-thrust bearings 231 for retaining it in the central bore of the cross head. The attachment of the mandrel to the stub shaft 230 is by means of a tapered or well-casing thread 232 tapped into the forward projecting part of the shaft and locked in place therein by lock nut 233. To the outer diameter of this forward part of stub shaft 230, is keyed a gripper sleeve bracket 234 having a plurality of radially projecting lugs upon which are pivoted at 235 the gripper arms 236, shown as four in number. The ends of gripper arms 236 extending towards the cross head 20 carry cam rollers 237 which cooperate with a cam sleeve 238 slidably and rotatably mounted on the sleeve bracket 234. The opposite ends of gripper arms 236 have adjustably mounted therein studs 239 upon the inner ends of which are forked brackets 240 carrying gripper dogs 241, which latter are circular in shape and eccentrically mounted in the forked brackets 240 by pivot pins 242. Radially placed pins 243 in the periphery of the gripper dogs 241 and connected to the gripper arms 236 by tension springs, serve to normally position the eccentricity of two opposing dogs in such a manner that the distance between them will be at its maximum and greater than the diameter of the tube to be formed. The eccentricity is also so disposed that as the dogs grip the tube the resistance of the tube to movement will tend to lessen the distance between the dogs and thus set still tighter the grip of the dogs on the tube. Gripper arms 236 are held normally away from gripping position by heavy leaf springs 245 carried on gripper sleeve 234.

The gripper mechanism is designed for manual operation for the gripping of the tube and for automatic release of same at the desired point. The construction to accomplish this consists of a forked lever 251 pivoted at 252 on a bracket 253 mounted upon the cross head 20. The fork of the lever 251 encompasses the cam sleeve 238 and is connected thereto by two semi-circular anti-friction shoes 254, which ride in an annular groove formed in the rear of said sleeve. The handle 251' of the lever 251 extends outwardly to within reach of an operator where it rests in a slotted bracket 255 carried on the cross head 20. A tension spring 256 secured to the handle 251' and to a finger 257 mounted on the handle bracket 255 serves to hold the cam sleeve 238 in non-gripping position. It will be seen from the foregoing that as the operator swings the lever 251 to the right (Fig. 38) the cam sleeve 238 is moved to the left and beneath the cam rollers 237 on gripper arms 236 thereby causing, by its wedge-shaped cross section, the gripper dogs 241 to clamp on the tube to strip same from the die and sleeve.

Since the mandrel cross head 20 and its associated gripper mechanism travels a considerable distance towards the tail stock during the stripper action it is desirable that automatic means be provided to retain the grip on the tube and then release it at a predetermined point midway of the travel of the cross head which continues moving to clear the mandrel from the tube. As embodied these means consist of a vertically arranged lock rod 260 whose upper end is beveled and located within the path of travel of the handle 251' where it is held by a lug 261 formed on the inner side of slotted bracket 255. The lower portion of the rod 260 is slidably mounted in a bearing lug 262 screwed into the cross head 20 and has its lower end pivoted to one end of the release lever 266. A compression spring 263 encircling the lock rod 260 between the bearing lug 262 and a collar 263, serves to hold the rod in its upper or locking position, which position is determined by the collar 265. The release lever 266, to which the rod is pivoted, is itself pivoted to the cross head 20 at 267 and its other end is provided with a roller 268 which lies directly over a finger 223 formed on the end of the traveling guide box latch bar 216. This arrangement forms the cooperative connection between the gripper release mechanism and the detaching mechanism for bringing the traveling guide box 180' to a standstill as soon as the tube is clear of the die and sleeve and allows the two operations to be performed by the same cam 224.

The sequence of operations of these latter gripper release and detaching mechanisms is as follows: as the extrusion stroke ends the front end of the tube comes to rest inside the circle of gripper dogs 241, the operator then throws the lever 251' to lock the dogs into the tube end. This movement carries the lever over and past the lock rod 260 which then retains the lever in locked position. At this point the traverse mechanism (to be described later) is started and withdraws the tube and with it the mandrel 28 from the die 16 and guide sleeve 17. At the point in the travel where the nubbin end of the tube clears the guide sleeve 17 sufficient for recovery by overhead cranes, the rollers 221 on latch bar 216 meet the cams 224 and cause latch bar 216 to raise and be unhooked from its attachment to cross head 20, the latter continuing on its way to withdraw the mandrel from the tube. At the same instant that the latch bar 216 is raised for release from the cross head it actuates lever 266 to depress lock rod 260 and release the handle 251', thus dissociating the tube from the cross head and allowing it to come to rest on the two guide boxes 180 and 180'.

The rapid traverse screw 29 whose purpose is the movement of the mandrel 28 is joined to the latter through its connection to mandrel stub shaft 230 by means of threaded end 281. The rotation of the traverse screw 29 is accomplished by an electric motor 277 which is mounted on the top of the cross head 20 whose drive pinion 276 meshes with a large bull gear 275 keyed to the end of the stub shaft 230. The traverse screw is rigidly attached to the bull gear 275 by a flange 280 and cap screws 282. The opposite end of the traverse screw passes through the fixed nut 30 which is secured in the center of the tail stock 21 by flange and cap screw.

As the traverse screw projects itself rearwardly (right in Fig. 16) it is necessary to protect and support it. A guard pipe 284 of sufficient length for this purpose is provided which is mounted in pillow blocks 285 carried on stanchions 286. Anti-friction washers 283 mounted upon the end of the traverse screw serve to protect the end of the screw from possible injury as it enters and leaves the guard pipe 284. A pair of lock nuts 287 placed on the traverse screw near the cross head 20 may be used as stop members to actuate a stop switch (not shown) for arresting the rearward movement of the said screw.

In the operation of the machine during the extrusion stroke, the mandrel is held stationary while the die, billet and tube are revolving, but during the stripping action the mandrel is revolved also. During the time the mandrel is to be held stationary the high tortional strains therein require a correspondingly strong mandrel locking means to resist them but the locking means must also be capable of quick release at the time it becomes necessary to revolve the mandrel. The construction involved to attain these results consists of a manually operated lock plug 290 reciprocally mounted in a bore 292 formed in the cross head 20. A lock hole 291 is formed in the body of the stub shaft 230 for the reception of the end of the lock plug 290. Thus when the lock plug projects into the hole 291, the stub shaft 230, and hence the mandrel and traverse screw, are securely locked against rotation, but such stub shaft is free to rotate when the plug is withdrawn into the bore 292. A stem 293 on the lock plug 290 extends through a bearing in a fulcrum bracket 297 bolted upon the side of the cross head 20. A forked member 294, attached to the end of stem 293, is secured by pivot pin 301 to the hand-lever 300. A spring 295 with its thrust collar 296 encircles the stem 293 within the bore 292 to normally urge the lock plug 290 into locked position. The hand lever 300 is pivoted at 298 on the fulcrum bracket 297 and extends downwardly to within reach of the operator. A manually operated latch hook 302, pivoted on bracket 303, is provided on the cross head 20 adjacent the grip of hand lever 300 to hold the lever and lock plug 290 in unlocked position during the traverse movement of the cross head.

The tie rods 26 connecting the tail stock 21 with the central thrust block 19 are of such a length that it becomes necessary to provide intermediate support and this support must be such as not to interfere with the travel of the mandrel cross head 20 along said tie rods. (See Figs. 15 and 39.) This function is performed by stanchion brackets 27, arranged in pairs along the outside of the tie rods which have half-bosses 310 formed thereon for receiving the tie rods that are the complements of the half bearings 200 of cross head 20. Tie bars 312 bolted into lugs 313 on the tops of stanchions 27 connect the paired stanchions to form a rigid support for the tie rods 26 and at the same time leave the entire area between the tie rods clear for the passage of the mandrel cross head 20 therebetween.

It is essential that means be provided to hold the completed tube Y at rest upon the guide boxes 180, 180' so that, after the tube has been withdrawn from the die and sleeve by the gripper mechanism, the mandrel 28 may be stripped from the tube and the latter removed to storage or point of next operation. Such means comprise a clamp lever 320 built to conform to the tube contour and freely pivoted on rocker shaft 322 journaled in brackets 323 bolted on the side of traveling guide box 180'. Operator's handle 321, formed as part of the clamp lever 320 is heavier than the latter and acts to keep the clamp lever in "off" position except when needed. Stop lug 321' prevents handle 321 from dropping too far out of reach of the operator (see Fig. 40).

When the tube Y has been cleared from the die and sleeve and the mandrel stripped from the tube, it then becomes necessary merely to recover the tube from the machine for transportation to points of further operation (see Figs. 41 and 42). This may be accomplished in a number of ways such as manually by toggle irons, overhead cranes, etc. In the form shown a plurality of tube throw-out arms 324 are fixed on rocker shaft 322 and lie between guide rollers 182 beneath the line of support for the tube. A hand lever 325 is also fixed on rocker shaft 322 for actuating arms 324. As this lever is swung downwardly by the operator it will be seen that the tube Y will be lifted out of the guide rollers 182 and rolled over the sides of guide boxes upon a recovery rack (not shown) which may be arranged at this point. The above described portion of the recovery mechanism is designed to be mounted on the traveling guide box 180'. Similar mechanism is provided on stationary guide box 180 so that the full length of the tube may be raised simultaneously. It comprises corresponding parts such as throw-out arms 324, rocker shaft 326, shaft brackets 327 and operating handle 325'. These are all mounted on stationary guide box 180.

Spring means are provided for keeping the arms 324 out of action until needed. Tension springs 329 are secured on one end to the guide boxes 180, 180' and on the other to arms 328 affixed to rocker shafts 322, 326. Stop pins 331 placed beneath the arms 328 limit the motion of rocker shafts in one direction.

Referring now to Figs. 43 and 44, the construction therein shown comprises a modified form of tube recovery mechanism designed to replace the hand-operated throw out arms 324. Such mechanism is power operated with automatic delivery of the tube to a conveyor rack and is similar in many respects to the billet elevator previously described. It comprises a hydraulic cylinder 391 set into the foundation, a piston 392, a rectangular plate 393 secured to the top of said piston, a pair of guide rods 400 with stop nuts 401 thereon mounted upon plate 393 and a cradle 394 hinged to plate 393 by pivot rod 395. A spring 396 encircles the pivot rod 395 and by proper abutments against plate 393 and cradle 394 serves to maintain the cradle in vertical position. The position of this mechanism is on the axial plane of the machine and directly beneath the traveling guide box 180' which has a slightly modified undercarriage 390 to accommodate the mechanism. The position is such that it is substantially under the center of the finished tube at the time the tube has been stripped from the guide sleeve and is ready for recovery. The recovery rack 399, which may be of any desired construction such as angle iron, is placed above the machine and may rest on one of the upper tie rods 26. The device for delivering the tube to the rack 399 from the cradle 394 consists merely of a trip arm 397 formed on the side of the cradle in a position to strike a tripper bar 398 conveniently placed on the recovery rack. Thus it will be seen that when the tube is ready for recovery the traveling guide box 180' is no longer over the tube elevator and the latter may be actuated to lift the tube from the guide rollers and raise it to the recovery rack at which point the trip arm 397 strikes the tripper bar 398 and dumps the tube onto the rack where it rolls or is otherwise removed from the machine.

Having described the preferred and modified construction of the invention, the cycle of operation will now be considered, with especial reference to Figs. 1 to 10. The machine is first made ready by preheating the die which is preferably accomplished, as previously described, by inserting heated billets therein until their heat has been transferred to the die and associated parts to raise them to the desired maximum temperature. Thereafter, the continuous running of the machine during the actual extrusion operations serves to maintain the proper temperature of the parts for their maximum efficiency. Assuming, then, that the cycle to be described is one more nearly in the middle of a continuous run, the billet X is withdrawn from an adjacent furnace when it has reached the proper extrusion temperature and quickly conveyed to the cradle 174 of the billet elevator. The operator then opens valve E to pressure (see Fig. 6) thus allowing the hydraulic power to flow through pipe line 179 to elevator cylinder 170 and lift the billet to the axis of the machine where it is stopped in alignment with the mouth of the die 16 and the nose of the mandrel 28'.

The mandrel 28, during the time the billet was being placed and raised to the axial line, has been rotating and returning towards the die. The timing of the apparatus is such that when the billet reaches the charging position (see Fig. 10) the advancing mandrel contacts with it and causes it to slide from the cradle 174 into the mouth of the die 16. When a sufficient length of the billet enters the die to insure its support therein, the valve E is opened to exhaust and the cradle 174 quickly drops out of the way to its low or billet-receiving position. Mandrel 28 continues its die-ward movement until the billet X is entirely within same.

As the mandrel nears the end of its forward or billet-charging movement, an automatic stop switch Q carried on the mandrel cross head 20 strikes a stop collar R on one of the upper tie rods 26. The switch Q is a snap switch which only acts to interrupt the current through the main relay switch L, merely opening and immediately closing each time it strikes a stop collar. Its momentary opening however serves to open the main switch L to stop the traverse motor 277 and bring the mandrel to a stop somewhat short of the final position desired. The further traverse of the mandrel forward is accomplished by an "inching" movement given it by the operator opening and closing the main switch L. Its final position is determined by the lock plug 290 (unlatched at the time the traverse motor was first stopped) dropping into the lock hole 291 in the mandrel stub shaft 230. Reversing switch N is then thrown to prepare the traverse motor 277 for its stripper action to follow later.

While the above operation is taking place the guide sleeve cross head 18, which carries the mandrel centering mechanism, is moved dieward by admission of pressure to cylinders 160 through the valve G and pipe line 163. This movement continues until the forward end of the mandrel centering mechanism seats itself in the mouth of the die to complete the system whereby the billet is protected from deleterious oxidizing influences and the tube properly guided during its initial stage of formation.

Everything is now in readiness for the extrusion operation. The various units have assumed the positions illustrated in Figs. 1 and 1A wherein the billet entirely fills the extrusion chamber with one end against the breech plug 62 and the other against the nose of the forming mandrel 28'. The mandrel is locked against rotation by lock plug 290 and is held in accurate alignment by the manually manipulated mandrel centering mechanism carried in the forward part 125 of the cross head 18. The operator starts the extrusion stroke by first closing the switch J, which energizes the die rotating motor 94. As soon as the die has reached the proper speed desired, the valve A is opened to pressure, sending the full hydraulic power through pipe line 10' to main cylinder 10 and thereby causing the plunger 12, cross head 13, thrust barrel 55 and die container 15 to move forward upon the tie rods 25 and rollers 43. This forward motion which constitutes the extrusion stroke forces the plastic metal of the rotating billet over the nose of the mandrel and through the annular passage between the outside diameter of the mandrel nose and the inside diameter of the die liner 100. As soon as the first few inches of the extrusion has taken place and the tube enters the forward portion of the cross head 18, the mandrel centering device is manually released so as not to interfere with the passage of the tube. From this point to the end of the stroke the centering of the mandrel is automatically maintained by the forces acting within the rotating billet and tube and the mandrel.

As the extrusion progresses, the guide sleeve 17 is pushed ahead of the die and through central thrust block 19 until its forward end approaches the roller guide box 180 at which time the advancing tube passes forwardly out of the sleeve and is then progressively supported first by guide box 180 and then traveling guide box 180'. The various machine parts and their movements are so proportioned and adjusted and synchronized that, for the particular weight of billet used, the length of tube formed is such that its forward end at the conclusion of the forming stroke just reaches the point at which the mandrel is secured to the stub shaft 230 at cross head 20. This brings the end of the tube into a position to be temporarily secured to the mandrel cross head by gripper dogs on levers 236. The machine has now assumed the position illustrated in Fig. 7, which is the end of the extrusion stroke.

The tube having now been fully formed it becomes necessary to recover the same from the die and guide sleeve, wherein a portion of the tube remains, and to return the parts to their proper position for its next cycle.

At the end of the extrusion stroke the valve A is opened to exhaust and valve B, controlling the drawback cylinders 14, is opened to pressure to retract the plunger cross head 13 and thrust barrel 55 a short distance. The purpose of this is to remove the breech plug 62 to clear the way for the ejection stroke of cylinder 52. Simultaneously with the forward movement of the ejector plunger 54, caused by opening valve C to pressure, the operator clamps grippers 236 on the forward end of the tube and releases the mandrel lock plug 290 from the mandrel preparatory to the rotation and traverse of the mandrel backwardly. At this point, if it is found desirable, the die rotating motor 94 may be stopped by opening switch J.

As the ejector moves forward and makes contact with the nubbin end of the tube the operator closes switch L to start the mandrel traverse motor 277. This causes the cross head 20 to move towards the tail stock 21 and by means of the grippers 236 pull the tube with it. The first portion of this pulling movement is to extract the tube from the die and it is materially assisted in this by the ejector 54. The continued cross head movement draws the tube back through the guide sleeve 17 until it rests wholly upon the roller guide boxes. The traveling roller guide box 180', which is interlocked with the cross head 20, is carried rearwardly with the latter, along tracks 192, where it later serves to support the forward end of the tube after the mandrel has been withdrawn. When the nubbin end of the tube clears the guide sleeve 17, the traveling guide box and cross head are unlocked and, simultaneously, the grippers 236 are released so that the tube is now free to come to rest upon the two roller guide boxes while the mandrel is withdrawn from its interior. To insure that the tube remains stationary while this takes place the tube clamp 320 is actuated at the time the grippers are released (see Fig. 8).

The continuing movement of the cross head 20 now helically withdraws the mandrel from the stationary tube and leaves the latter on the guide boxes entirely free from any of the forming mechanism. The rearward movement of the mandrel is arrested at the proper point by the stop switch Q striking the rear stop collar S on the upper tie rod 26. The tube is now ready to be removed from the machine either manually or by the tube elevator as previously described (see Fig. 9).

While the tube is being cleared of the mandrel and placed upon the recovery rack the power end of the machine is prepared for the next cycle. First the ejector plunger 54 is returned to its housing within the thrust barrel 55. The plunger cross head 13 is then returned to charging position by the draw-back cylinders 14 and the breech plug 62 replaced in the thrust block 60. The die container 15 is then returned to its charging position against the thrust block 60 by admitting power to cylinders 110 through valve H.

By the time these power parts are returned to charging position the tube has been recovered and the next billet is being made ready to place on the cradle 174. Just previous to removing the billet from the furnace the traverse motor 277 is reversed and the mandrel started on its return journey towards the die, the cross head 20 picking up, on its way, the traveling guide box 180'. In timed relation with the forward movement of the mandrel, the billet is placed upon the elevator and reaches charging position just as the mandrel comes forward to meet it and project it into the die mouth, thus completing the cycle of the apparatus and bringing the various parts back to the position shown in Fig 1.

By effecting the movement of the metal in opposition to the opposed pressure of the stationary forming means or mandrel which, as herein explained, is accomplished through the application to the movable die container of the pressure required for the extrusion, a great reduction in friction is accomplished as compared with the friction resulting from the flow of the metal and the tendency of the metal to expand against the walls of a die when the metal is projected forwardly throughout the entire length of a stationary die, as occurs in forward extrusion operations as distinguished from my so-called invert extrusion operation.

Since the guide sleeve which I provide in my improved apparatus moves in the same plane as the container itself, and since the bore thereof is but slightly larger than the external diameter of the tube, it maintains the tube substantially straight, besides supporting the mandrel and assisting in preventing the whipping or buckling thereof under the terrific pressures opposed thereto. Furthermore, such sleeve tends to render more gradual the cooling of the shape extruded from the die than would be the case as in ordinary extrusion operations where the tube is extruded directly into the open air immediately the same is formed and consequently such guide sleeve tends to, in a sense, normalize the structure of the metal and to reduce the ultimate tortional strains therein.

The breech block which I employ to seal one end of the extrusion chamber, entirely eliminates any possibility of flash-back which is a serious objection in all operations involving forward extrusion, as if the plunger employed in such operations fits the die too snugly, the pressure required to move the same along the die is excessive and if a plunger having a loose fit is employed, a very substantial flash-back of the metal is almost inevitable.

The preferred temperature to which a billet is heated in carrying out my improved method is a temperature substantially below the melting point of the metal employed and considerably above a rolling temperature, and in the case of carbon steel, the preferred temperature to which the metal is heated to render the same plastic is 2300-2390° F. and desirably about 2350° F. at the time it is projected into the die.

By the term "elongated" as employed in the claims, reference is had to an extrusion chamber which is of substantially greater length than its diameter.

While I preferably rotate the chamber during the extrusion operation to reduce friction and improve the wall dimensions of the extruded tube, the carrying out of the extrusion operation without rotation either of the container or the die is also within the scope of my invention as embraced within the scope of the claims.

Furthermore, while I preferably employ a cylindrical die or extrusion chamber, especially where the container and die are rotated during the extrusion operation, I also contemplate the employment of a die or extrusion chamber of square or other polygonal cross-section, particularly in those cases where no rotation of the container or the die is effected during the extrusion operation and in such cases the nose of the mandrel may either be circular in cross-section or may also be polygonal to correspond with the polygonal configuration of the die.

Various modifications within the scope of the appended claims may be made without departing from the spirit of my invention.

Having thus described my invention, I claim:

1. The method of extruding tubular shapes, which comprises introducing a metal blank heated to a plastic condition into an elongated extrusion chamber having an open end, positioning a mandrel in the open end of said chamber and in symmetrical spaced relation with respect to the inner wall thereof; then, while maintaining the other end of said chamber in a sealed condition, causing the movement of said chamber and the blank carried therein longitudinally with respect to such mandrel while effecting the extrusion of the metal of said blank through the space between the end of the mandrel and the adjacent wall of metal surrounding the mandrel adjacent the end thereof, confining the extruded shape as it issues from said chamber and pending a complete ejection therefrom within a metallic tubular guide, removing said extruded shape from said tubular guide and also removing the mandrel from the extruded shape and recovering the latter.

2. The method of extruding tubular shapes, which comprises introducing a metal blank heated to a plastic condition into a cylindrical extrusion chamber having an open end, positioning a mandrel in the open end of said chamber and in symmetrical spaced relation with respect to the inner wall thereof; then, while maintaining the other end of said chamber in a sealed condition, causing the progressive advance of said chamber and the blank carried therein longitudinally with respect to such mandrel while effecting rotation of said chamber and while substantially preventing longitudinal movement of the mandrel, thereby extruding the metal of said blank through the space between the end of the mandrel and the adjacent wall of metal surrounding the mandrel adjacent the end thereof, confining the extruded shape as it issues from said chamber and pending a complete ejection therefrom within a metallic sleeve, removing said extruded shape from said sleeve and also removing the mandrel from the extruded shape and recovering the latter.

3. The method of extruding tubular metal shapes, which comprises introducing a metal blank heated to an extrusion temperature into a cylindrical extrusion chamber, one end of which is sealed and the other end of which is open, partially closing the open end of said chamber with the nose of a mandrel whose maximum internal diameter is approximately equal to the diameter of the desired shape to be extruded, then while effecting rotation of said chamber and while maintaining said mandrel stationary, causing said chamber to advance toward and along said mandrel until the nose of the latter has penetrated substantially throughout the entire length of the chamber, then uncovering the sealed end of the chamber and introducing an ejector element through such uncovered end, then causing the complete removal of the mandrel and the extruded shape carried thereby from the chamber, then removing the mandrel from within the extruded shape and recovering the latter.

4. The method of extruding tubular metal shapes, which comprises introducing a metal blank heated to an extrusion temperature into a cylindrical extrusion chamber, one end of which is sealed and the other end of which is open, partially closing the open end of said chamber with the nose of a mandrel whose maximum internal diameter is approximately equal to the diameter of the desired shape to be extruded, advancing a sleeve, of an internal diameter corresponding to the external diameter of the shape to be extruded, into contact with the partially open end of said container and with the bore of such sleeve in registry with that of the container, then while effecting rotation of said chamber and while maintaining said mandrel stationary, causing said chamber to advance toward and along said mandrel until the nose of the latter had penetrated substantially throughout the entire length of the chamber, then uncovering the sealed end of the chamber and introducing an ejector element through such uncovered end, then causing the complete removal of the mandrel and the extruded shape carried thereby from the chamber, then removing the mandrel from within the extruded shape and recovering the latter.

5. In an extrusion apparatus, the combination of a rotatable die container having a central die therein that is adapted to rotate with said container, means for rotating said container, a mandrel adapted to be projected into one end of said die, means for advancing and retracting the same towards and from said die, means for advancing and retracting said container and thereby effecting the extrusion of a blank confined within said die into a tubular shape of the desired configuration, means adapted to engage the extruded portion of the tubular shape for effecting the withdrawal of such extruded shape from the die and means for completely sealing one end of said container during the actual extrusion operation.

6. In an extrusion apparatus for making tubular shapes, the combination comprising a rotary die container having a die positioned therein and rotatable therewith, a longitudinally movable mandrel adapted to be projected into one end of said die, removable means for sealing the other end of said die during the actual extrusion operation, means for moving said sealing means out of contact with said die following the extrusion operation, ejector means adapted to be projected into said die following the removal of said sealing means from contact with the die, means for advancing said ejector means into the die, means for advancing and retracting said die container during the extrusion operation and thereby causing the traverse of the mandrel end, substantially throughout the entire length of the die, a guide sleeve associated with said die and having its longitudinal axis in alignment with the longitudinal axis of said die, the bore of said sleeve substantially corresponding in diameter to the external diameter of the shape to be extruded, means for advancing and retracting said sleeve axially towards and from said die container, means for preventing rotation of said sleeve during the rotation of said container and means for withdrawing the extruded shape from said container and said sleeve.

7. In an extrusion apparatus, the sub-combination comprising a rotatable, longitudinally movable container having a die centrally mounted therein and rotatable therewith, means for simultaneously rotating and longitudinally moving said container, a mandrel associated with said die and longitudinally movable with respect thereto, said mandrel being adapted to co-operate with said die to form an extrusion annulus between the inner wall of said die and the periphery of the nose of the mandrel, means for advancing and retracting said mandrel towards and from said die and means for effecting the removal of the extruded shape from said die.

STANLEY W. SPARKS.